US010621743B2

(12) United States Patent
Kiyota

(10) Patent No.: US 10,621,743 B2
(45) Date of Patent: Apr. 14, 2020

(54) PROCESSING-TARGET IMAGE CREATING DEVICE, PROCESSING-TARGET IMAGE CREATING METHOD, AND OPERATION ASSISTING SYSTEM

(71) Applicant: SUMITOMO HEAVY INDUSTRIES, LTD., Tokyo (JP)

(72) Inventor: Yoshihisa Kiyota, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 634 days.

(21) Appl. No.: 14/878,150

(22) Filed: Oct. 8, 2015

(65) Prior Publication Data
US 2016/0035110 A1 Feb. 4, 2016

Related U.S. Application Data

(63) Continuation of application No. PCT/JP2014/054347, filed on Feb. 24, 2014.

(30) Foreign Application Priority Data

Apr. 24, 2013 (JP) .................................. 2013-091803

(51) Int. Cl.
*G06T 7/60* (2017.01)
*G06T 3/00* (2006.01)
(Continued)

(52) U.S. Cl.
CPC ................. *G06T 7/60* (2013.01); *B60R 1/00* (2013.01); *G06K 9/00791* (2013.01); *G06K 9/52* (2013.01);
(Continued)

(58) Field of Classification Search
CPC .... G06T 7/60; G06T 7/73; G06T 7/33; B60R 1/00; G06K 9/00791; G06K 9/52
(Continued)

(56) References Cited

U.S. PATENT DOCUMENTS 6,195,204 B1 * 2/2001 Nalwa ................ G02B 27/1066
348/36
7,307,655 B1 * 12/2007 Okamoto ........... G06K 9/00791
348/222.1
(Continued)

FOREIGN PATENT DOCUMENTS

EP 2447910 5/2012
JP 2002-083285 3/2002
(Continued)

OTHER PUBLICATIONS

International Search Report dated May 20, 2014.

*Primary Examiner* — Sath V Perungavoor
*Assistant Examiner* — Kristin Dobbs
(74) *Attorney, Agent, or Firm* — IPUSA, PLLC

(57) ABSTRACT

A processing-target image creating device creates a processing-target image based on a plurality of input images. The processing-target image creating device includes a coordinates-associating part configured to associate coordinates on each input image plane on which each input image is positioned, coordinates on a space model onto which each input image is projected, and coordinates on a processing-target image plane, and an image adjusting part configured to adjust the processing-target image by determining for each input image a re-projection angle of a re-projection line joining the coordinate and the coordinate. The image adjusting part determines for each input image slopes of the re-projection lines such that each coordinate on the processing-target image plane corresponding to an infinity line in each input image corresponds with each other on a dividing line between image parts corresponding to each input image on the processing-target image plane.

17 Claims, 21 Drawing Sheets

(51) Int. Cl.
  *B60R 1/00* (2006.01)
  *G06T 7/73* (2017.01)
  *G06T 7/33* (2017.01)
  *G06K 9/00* (2006.01)
  *G06K 9/52* (2006.01)

(52) U.S. Cl.
  CPC .............. *G06T 3/00* (2013.01); *G06T 3/0062* (2013.01); *G06T 7/33* (2017.01); *G06T 7/73* (2017.01); *B60R 2300/607* (2013.01); *G06T 2200/32* (2013.01); *G06T 2207/30252* (2013.01)

(58) Field of Classification Search
  USPC .......................................................... 348/148
  See application file for complete search history.

(56) References Cited

U.S. PATENT DOCUMENTS

| | | | |
|---|---|---|---|
| 8,848,981 | B2 | 9/2014 | Kiyota |
| 2002/0018047 | A1 | 2/2002 | Okada et al. |
| 2004/0260469 | A1 | 12/2004 | Mizusawa |
| 2008/0309784 | A1* | 12/2008 | Asari ..................... B60R 1/00 348/222.1 |
| 2010/0053325 | A1 | 3/2010 | Inagaki |
| 2012/0069153 | A1 | 3/2012 | Mochizuki et al. |
| 2013/0033493 | A1 | 2/2013 | Kiyota |
| 2013/0033494 | A1 | 2/2013 | Kiyota |

FOREIGN PATENT DOCUMENTS

| | | |
|---|---|---|
| JP | 2009-171537 | 7/2009 |
| JP | 2011-223409 | 11/2011 |
| JP | 2012-147149 | 8/2012 |
| JP | 2012-191380 | 10/2012 |
| WO | 00/07373 | 2/2000 |
| WO | 2010/137265 | 12/2010 |
| WO | 2011/129274 | 10/2011 |
| WO | 2011/129276 | 10/2011 |

* cited by examiner

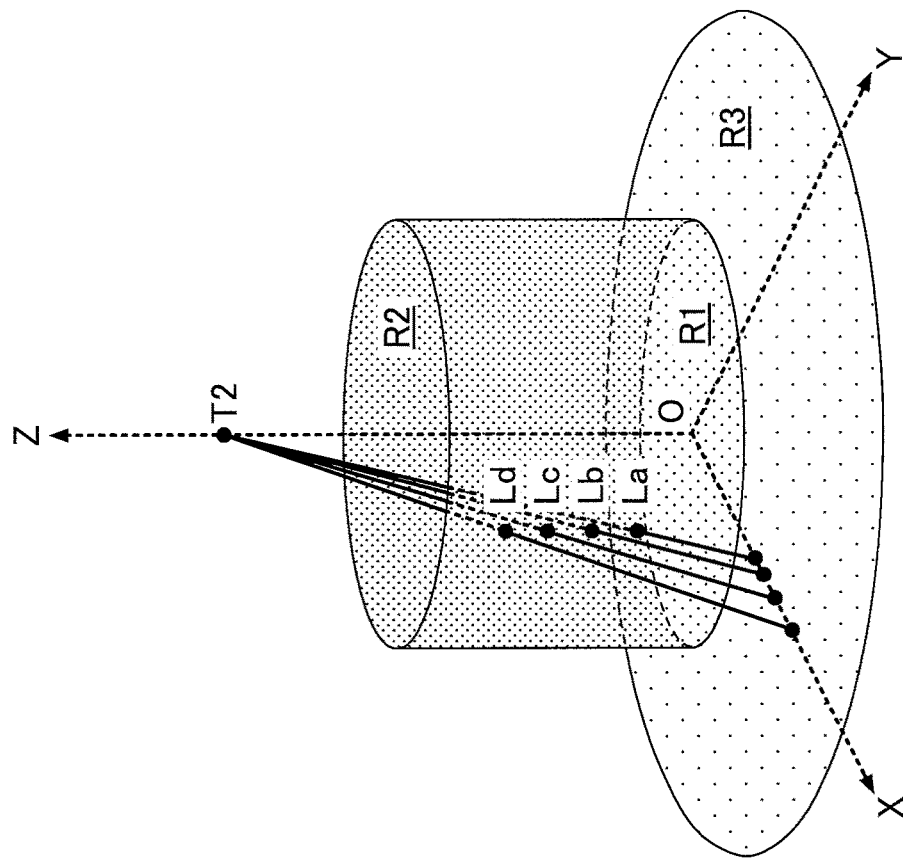
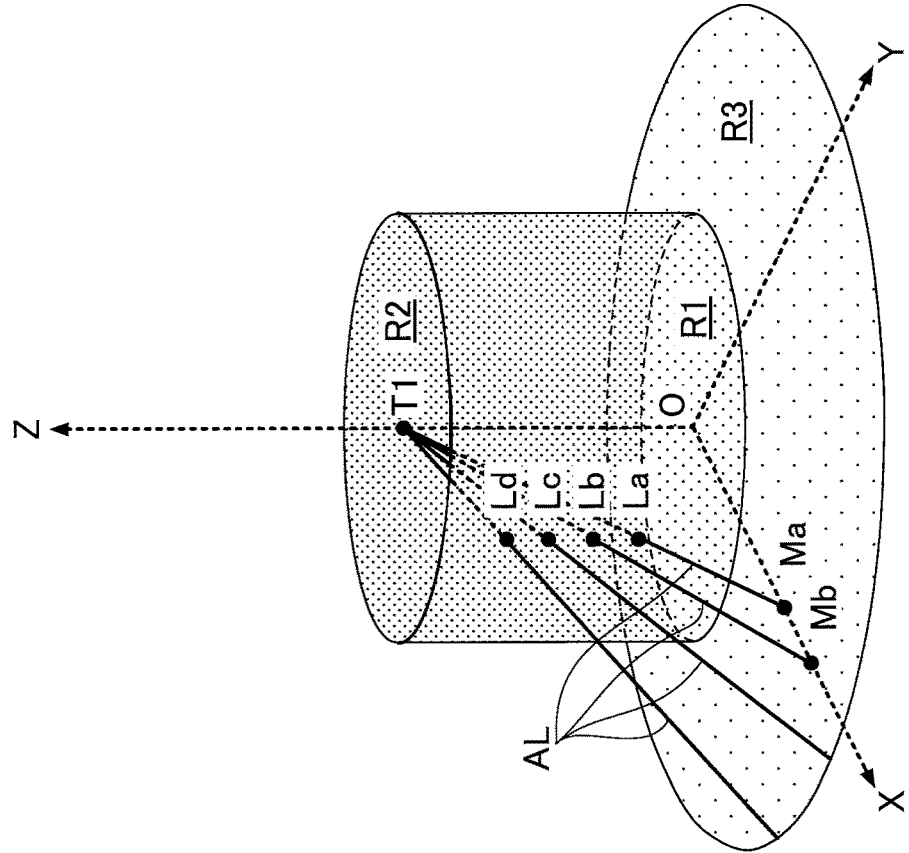

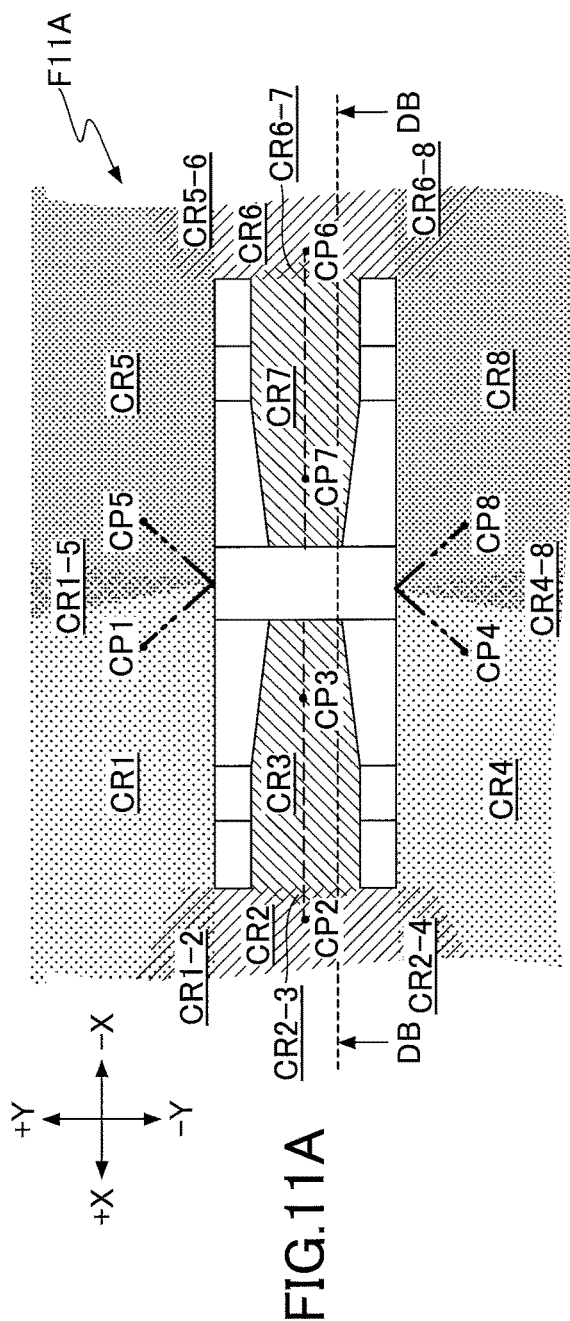

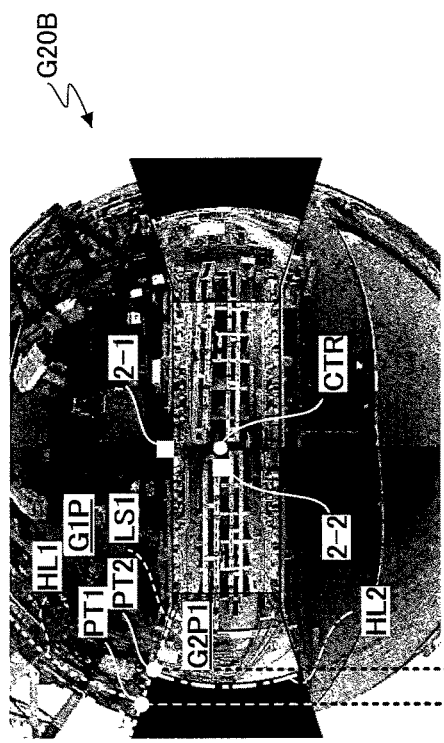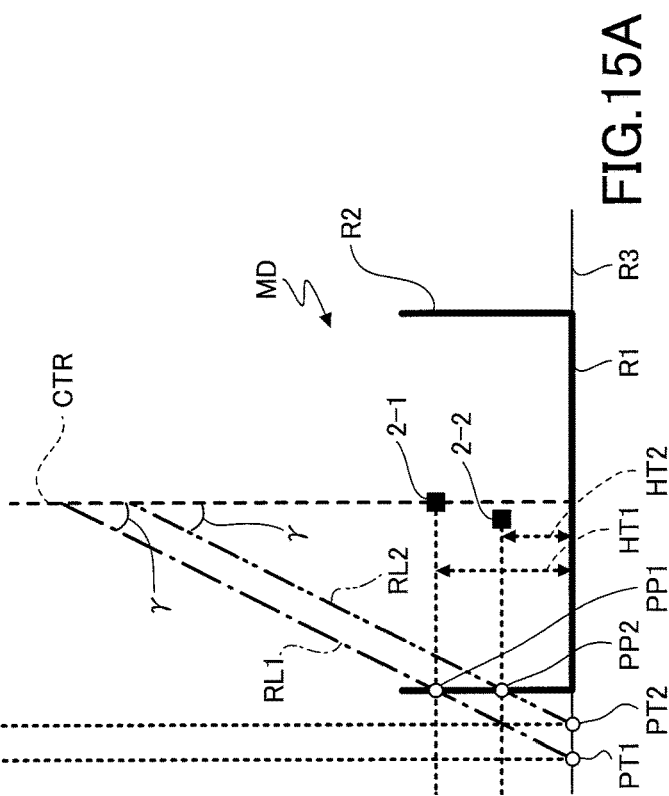
FIG.15A
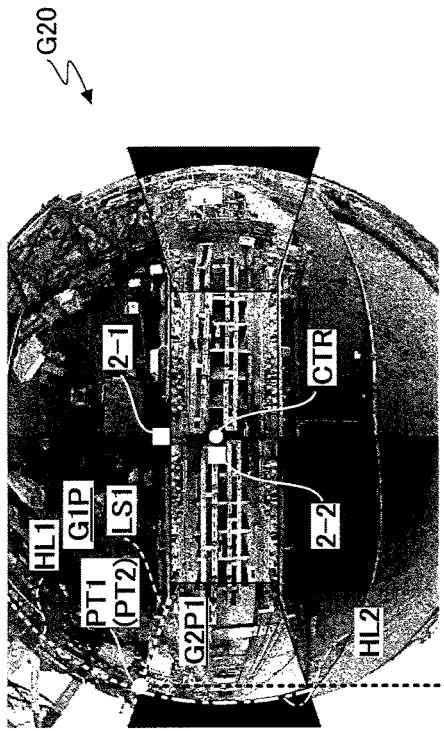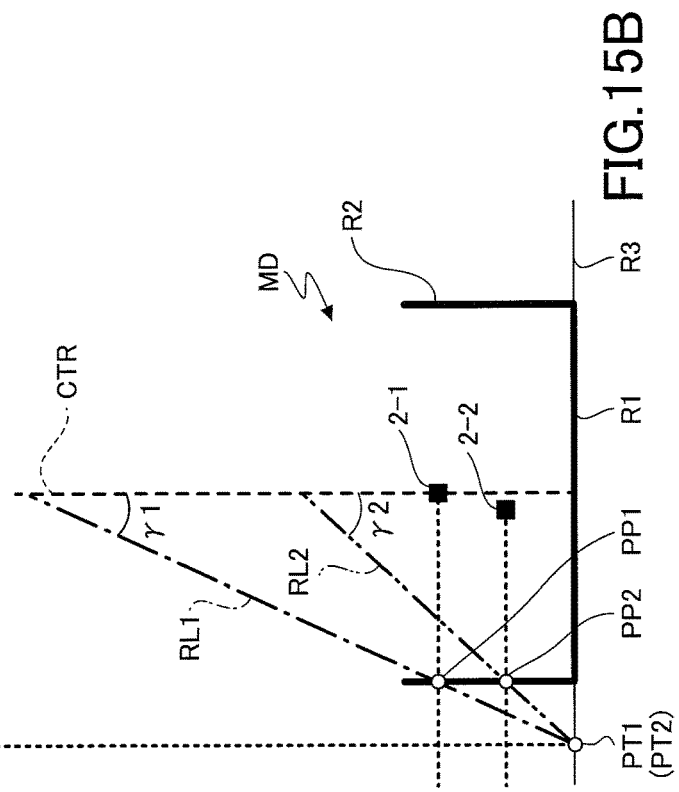
FIG.15B

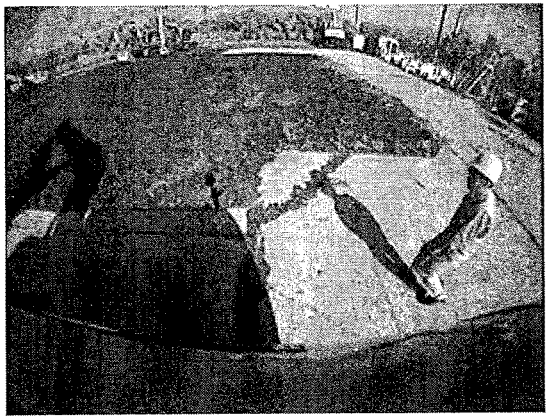
FIG.20C (INPUT IMAGE OF RIGHT CAMERA)
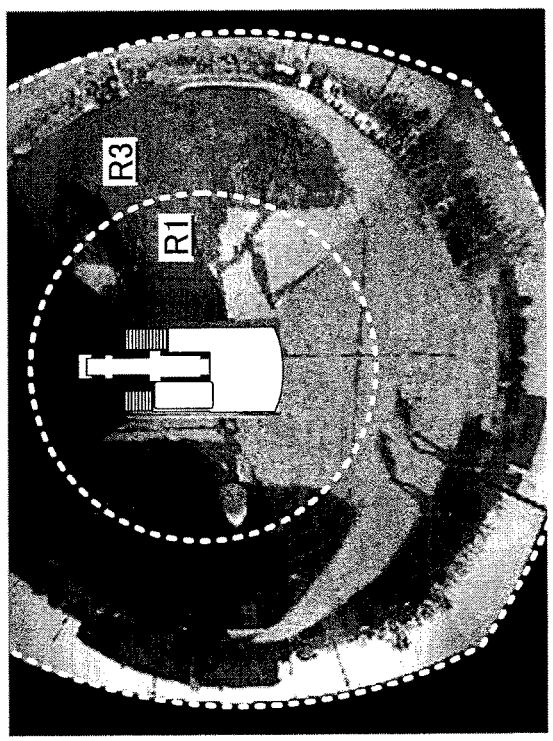
FIG.20A (OUTPUT IMAGE)
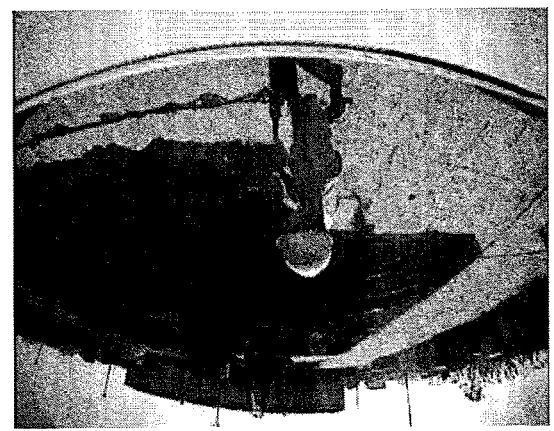
FIG.20B (INPUT IMAGE OF LEFT CAMERA)
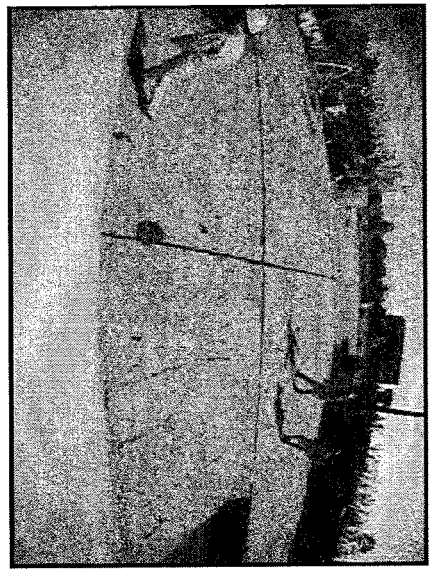
FIG.20D (INPUT IMAGE OF BACK CAMERA)

PROCESSING-TARGET IMAGE CREATING DEVICE, PROCESSING-TARGET IMAGE CREATING METHOD, AND OPERATION ASSISTING SYSTEM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/054347 filed on Feb. 24, 2014, designating the U.S., which claims priority based on Japanese Patent Application No. 2013-091803 filed on Apr. 24, 2013. The entire contents of each of the foregoing applications are incorporated herein by reference.

BACKGROUND

Technical Field

The present invention relates to a processing-target image creating device and a processing-target image creating method that creates a processing-target image subjected to an image conversion process for obtaining an output linage, and an operation assisting system using the device or method thereof.

Description of Related Art

An image creating device is known which maps an input image from a camera onto a predetermined space model in 3D space, refers to the mapped spatial data, and creates and displays a viewpoint converted image viewed from an arbitrary virtual viewpoint in 3D space.

This image creating device projects an image captured by a camera, mounted on a vehicle onto a steric space model comprised of a plurality of flat or curved surfaces surrounding the vehicle, creates a viewpoint converted image (a combination of a road surface image which virtually displays a state of a road surface viewed from directly above and a horizontal image virtually displays a scene in a horizontal direction) by using an image projected onto the space model, and displays the created viewpoint converted image to a driver.

Herewith, this image creating device makes it possible for a driver of the vehicle to associate an object in the viewpoint converted image with an actual object outside the vehicle without feeling uncomfortable when the driver has seen the viewpoint converted image, Also, an image creating device is known which can improve flexibility to adjust an output image in comparison to the image creating device as described above.

SUMMARY

There is provided according to an aspect of the invention a processing-target image creating device configured to create a processing-target image subjected to an image conversion process for obtaining an output image based on a plurality of input images captured by a plurality of cameras, including a coordinates-associating part configured to associate coordinates on each input image plane on which each input image is positioned, coordinates on a space model onto which each input image is projected, and coordinates on a processing-target image plane on which the processing-target image is positioned and onto which an image projected on the space model is re-projected, and an image adjusting part configured to adjust the processing-target image by determining for each input image a slope of a straight line joining a coordinate on the space model and a coordinate on the processing-target image plane corresponding to the coordinate on the space model. The coordinates-associating part associates the coordinate on the space model with the coordinate on the processing-target image plane such that each of the straight lines relating to one input image becomes parallel to one another on a plane perpendicular to the processing-target image plane, or associates the coordinate on the space model with the coordinate on the processing-target image plane such that each of the straight lines relating to one input image passes through a single predetermined point. The image adjusting part determines for each input image slopes of the straight lines such that each coordinate on the processing-target image plane corresponding to an image representing a predetermined feature in each input image corresponds with one another on a dividing line between image parts corresponding to each input image on the processing-target image plane.

There is also provided according to an aspect of the invention a processing-target image creating method of creating a processing-target image subjected to an image conversion process for obtaining an output image based on a plurality of input images captured by a plurality of cameras, including a coordinates-associating step of associating coordinates on each input image plane on which each input image is positioned, coordinates on a space model onto which each input image is projected, and coordinates on a processing-target image plane on which the processing-target image is positioned and onto which an image projected on the space model is re-projected, and an image adjusting step of adjusting the processing-target image by determining for each input image a slope of a straight line joining a coordinate on the space model and a coordinate on the processing-target image plane corresponding to the coordinate on the space model. In the coordinates-associating step, the coordinate on the processing-target image plane is associated with the coordinate on the space model such that each of the straight lines relating to one input image becomes parallel to one another on a plane perpendicular to the processing-target image plane, or the coordinate on the processing-target image plane is associated with the coordinate on the space model such that each of the straight lines relating to one input image passes through a single predetermined point. In the image adjusting step, slopes of the straight lines are determined for each input image such that each coordinate on the processing-target image plane corresponding to an image representing a predetermined feature in each input image corresponds with one another on a dividing line between image parts corresponding to each input image on the processing-target image plane.

There is also provided according to an aspect of the invention an operation assisting system configured to assist a travel or an operation of an operated body, including the above processing-target image creating device and a display part installed in an operation room for moving or operating the operated body, and configured to display an output image created based on a processing-target image created by the processing-target image creating device.

BRIEF DESCRIPTION OF THE DRAWINGS

FIG. 8A is an illustration of a case where all of auxiliary lines positioned on the XZ-plane extend from a start point on the Z-axis toward the processing-target image plane;

FIG. 8B is an illustration of a case where all of the auxiliary lines positioned on the XZ-plane extend from a different start point on the Z-axis toward the processing-target image plane;

FIG. 11A is a schematic diagram (a top view) of imaging ranges of the eight cameras in FIG. 10A;

FIG. 11B is a schematic diagram (a side view) of imaging ranges of the eight cameras in FIG. 10B;

FIG. 11C is a schematic diagram (a front view) of imaging ranges of the eight cameras in FIG. 10C;

FIG. 15A is a diagram illustrating an example of relationship between an output image and a re-projection angle;

FIG. 15B is a diagram illustrating another example of relationship between an output image and a re-projection angle;

FIG. 20A is a photographic illustration of an output image;

FIG. 20B is a photographic illustration of an input image taken by a left camera;

FIG. 20C is a photographic illustration of an input image taken by a right camera;

FIG. 20D is a photographic illustration of an input image taken by a back camera;

DETAILED DESCRIPTION

Hereafter, a description will be given, with reference to the drawings of a best mode for carrying out the invention.

Figure 1:
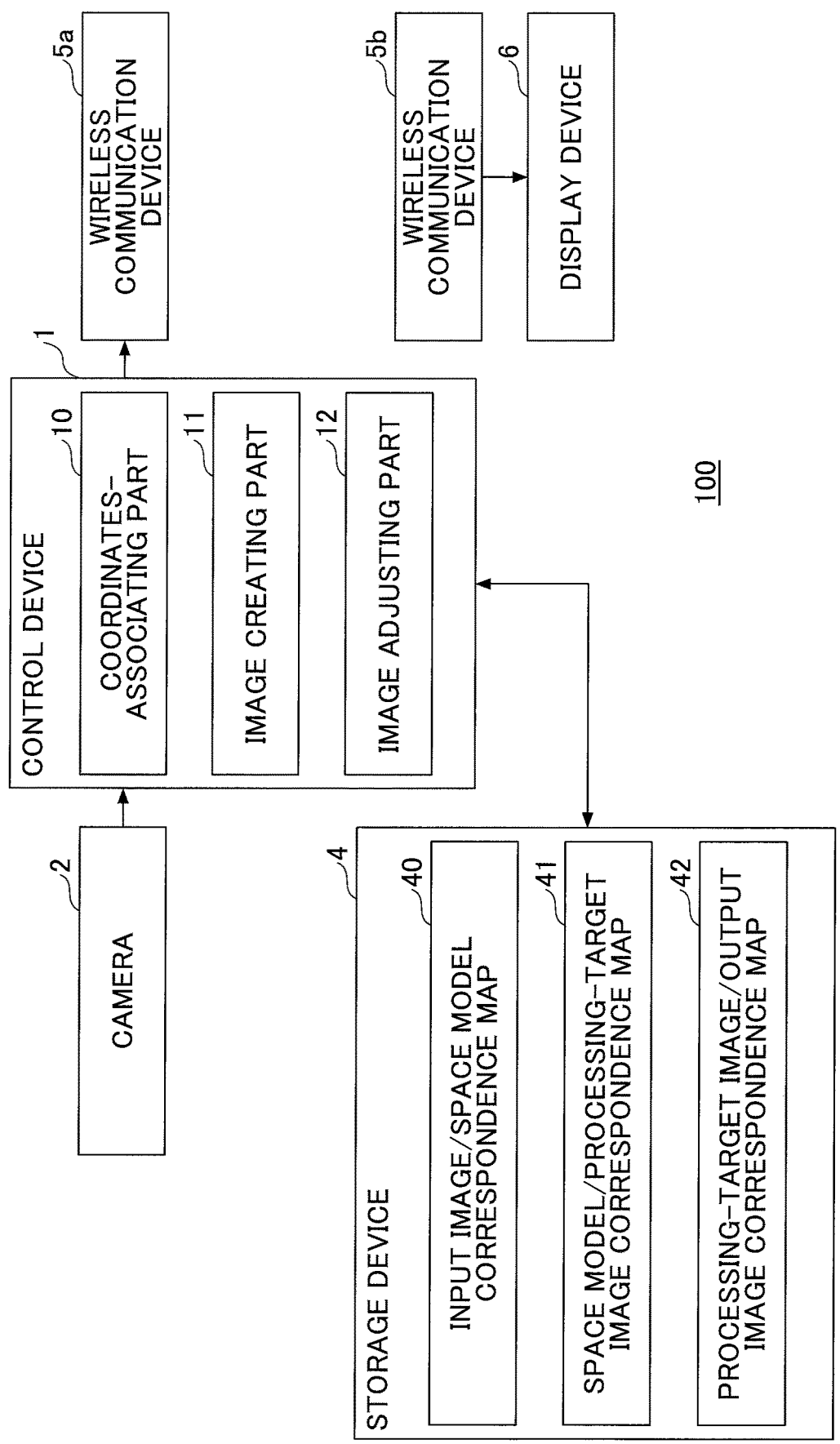
FIG. 1 is a block diagram schematically illustrating a configuration example of an image creating device according to an embodiment of the present invention.

FIG. 1 is a block diagram schematically illustrating a configuration example of an image creating device 100 mounted to a jib crane according to an embodiment of the present invention.

The image creating device 100 is an example of a perimeter-monitoring device that monitors a perimeter of a jib crane, and is configured by a control device 1, a camera 2, a storage device 4, wireless communication devices 5a, 5b, and a display device 6. Specifically, the image creating device 100 creates an output image based on an input image taken by the camera 2 mounted to the jib crane, and displays the output image on the display device 6.

Figures 2A, 2B:
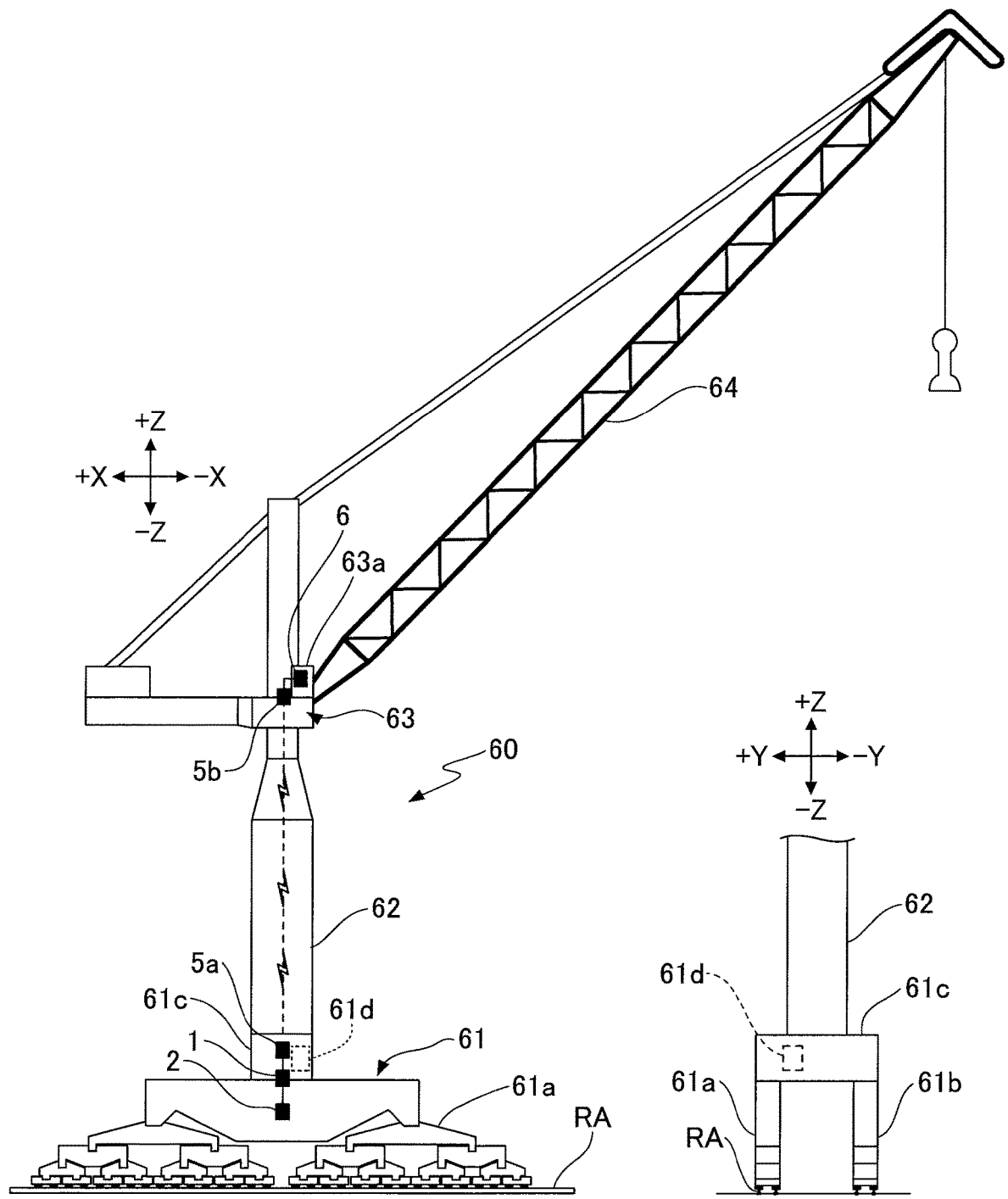
FIG. 2A is a side view illustrating a configuration example of a jib crane equipped with the image creating device in FIG. 1.
FIG. 2B is a front view illustrating a configuration example of a jib crane equipped with the image creating device in FIG. 1.

FIGS. 2A and 2B are diagrams illustrating a configuration example of a jib crane 60 to which the image creating device 100 is mounted, FIG. 2A is a side view of the jib crane 60, and FIG. 2B is a front view of the jib crane 60.

The jib crane 60 is a traveling crane placed in an outdoor location, and mainly has a running body 61 running on a rail RA, a tower body 62 located on the running body 61, a turning body 63 located on the tower body 62, and a jib 64 attached to the turning body 63.

The running body 61 has a portal frame comprised, of a pair of leg parts 61a, 61b and a beam part 61c connecting the pair of leg parts 61a, 61b, and is driven by a drive source 61d. In a state of FIG. 2A, the turning body 63 is provided with an operation room 63a at +Y side of −X side end part, The jib 64 is attached to a central portion of −X side end part. Also, the control device 1, the camera 2, and the wireless communication device 5a are located on the running body 61, the wireless communication device 5b is located on the turning body 63, and the display device 6 is located in the operation room 63a at a position where an operator can easily see.

Next, each component of the image creating device 100 will be described.

The control device 1 is a computer provided with a CPU (Central Processing Unit), a RAM (Random Access Memory), a ROM (Read Only Memory), a NVRAM (Non-Volatile Random Access Memory), etc. In the present embodiment, the control device 1 is located at the running body 61 or the tower body 62, stores in the ROM or the NVRAM, for example, programs corresponding to respective functional elements of a coordinates-associating part 10, an image creating part 11, and an image adjusting part 12 described later, and causes the CPU to execute processes corresponding to respective functional elements while using the RAM as a temporary storage area. Also, the control device 1 may be located at the turning body 63.

The camera 2 is a device for acquiring an input image which displays a perimeter of the jib crane 60, and comprised of an image pickup device such as a CCD (Charge Coupled Device) or a CMOS (Complementary Metal Oxide Semiconductor), etc. In the present embodiment, the camera 2 includes a plurality of running body cameras (described later) attached to the running body 61 so as to capture a blind area of an operator in the operation room 63a. In addition, the camera 2 may be equipped with a wide-angle lens or a fish-eye lens so as to capture a wide range.

Also, the camera 2 acquires an input image in response to a control, signal from the control device 1, and outputs the acquired input image to the control device 1. In addition, when the camera 2 acquires the input image using a fish-eye lens or a wide-angle lens, the camera 2 outputs a corrected input image to the control device 1 in which an apparent distortion or tilting, which is caused by use of those lenses, is corrected. However, the camera 2 may output the acquired input image without correction. In such a case, the control device 1 corrects an apparent distortion and tilting.

The storage device 4 is a device for storing various information, and includes, for example, a hard disk, an optical disk, a semiconductor memory, etc.

The wireless communication devices 5a, 5b are configured to send and receive a piece of information wirelessly. In the present embodiment, the wireless communication device 5a is located at the running body 61, and connected to the control device 1 through wired connection. Then, the wireless communication device 5a. sends wirelessly to the wireless communication device 5b an output Image that the control device 1 creates based on an input image of the camera 2. When the wireless communication device 5b has received wirelessly the output image sent from the wireless communication device 5a, the wireless communication device 5b outputs the received output image to the display device 6. Also, the wireless communication devices 5a, 5b may be located between the control device 1 and the camera 2. In this case, the wireless communication device 5a is located at the running body 61 or the tower body 62, and is connected to the camera 2 through wired connection. Also, the wireless communication device 5b is located at the turning body 63, and is connected to the control device 1 located at the turning body 63 through wired connection. By this configuration, the image creating device 100 can eliminate a problem related to a handling of a cable, a protection of a cable, or the like that occurs with the wired connection. For example, a stairway, an elevator, or the like by which an operator or a worker moves up and down is located at the tower body 62. Also, a number of cables which connects devices located at the running body 61 with devices located at the turning body 63 are located at the tower body 62. Thus, it is sometimes difficult to secure a space for installing further cables. Even in such a situation, the image creating device 100 can send and receive an image between the camera 2 and the display device 6 by using the wireless communication devices 5a, 5b.

The display device 6 is a device for displaying image information, and includes, for example, a liquid crystal display, a projector, or the like which is installed in the operation room 63a (refer to FIG. 2A) of the jib crane 60, and displays various images sent from the control device 1.

Moreover, the image creating device 100 may create a processing-target image based on an input image, may create an output image by applying an image conversion process to the processing-target image so that a viewer can intuitively recognize a positional relationship or a sense of distance with surroundings, and may display the output image on the display device 6.

The "processing-target image" is an image, which is created based on an input image and to be subjected to an image conversion process (for example, a scale conversion process, an affine conversion process, a distortion conversion process, a viewpoint conversion process, etc). Specifically, the "processing-target image" is an image suitable for an image conversion process, which is created from an input image by a camera capturing a ground surface from above. The input image includes an image of a scene (for example, a part of the sky) in a horizontal direction due to a wide angle of view. More specifically, the image creating device 100 projects the input image onto a predetermined space model so as to prevent the image of a scene in a horizontal direction from being displayed unnaturally (for example, so as to prevent a part of the sky from being recognized as a ground surface). Then, the image creating device 100 creates a processing-target image by re-projecting the image projected on the space model onto another two dimensional surface. However, the processing-target image may be used as an output image as it is without being subjected to an image conversion process.

The "space model" is a projection target of an input image. Specifically, the "space model" is comprised of one or more flat surfaces or curved surfaces including at least a flat surface or a curved surface other than a processing-target image plane, which is a plane on which the processing-target image is positioned. For example, the flat surface or the curved surface other than the processing-target image plane, which is a plane on which the processing-target image is positioned, is a flat surface parallel to the processing-target image plane or a flat surface or a curved surface forming an angle with the processing-target image plane.

Also, the image creating device 100 may create an output image by applying an image conversion process to an image projected onto the space model without creating a processing-target image. Moreover, the projected image may be used as an output image as it is without being subjected to an image conversion process.

Figure 3B:
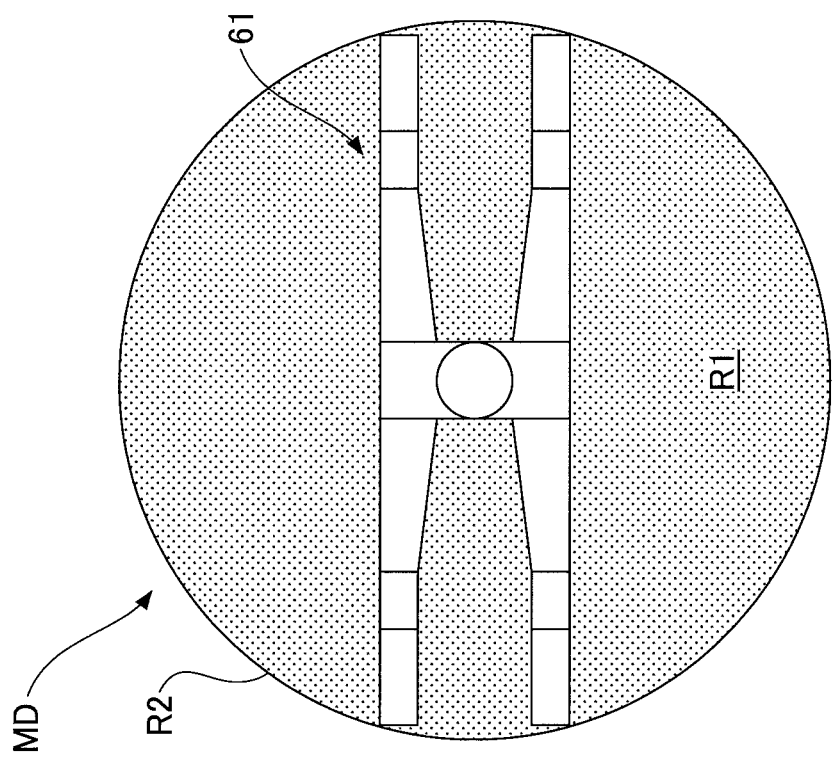
FIG. 3B is a top view of the space model in FIG. 3A.
Figure 3A:
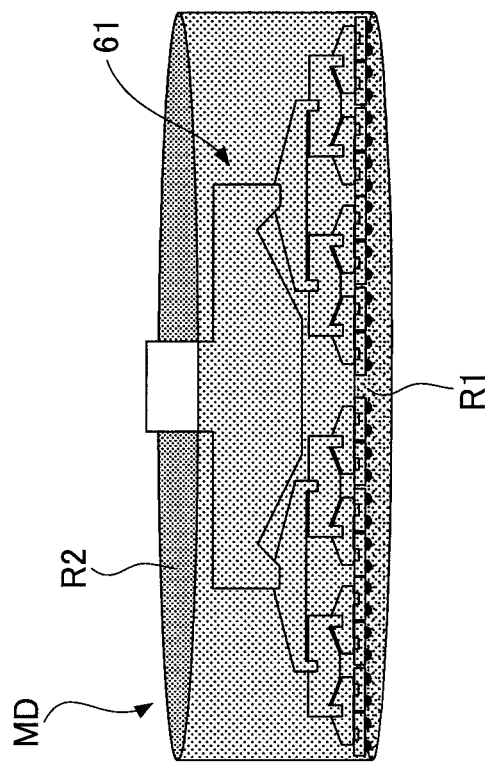
FIG. 3A is a perspective view illustrating an example of a space model to which an input image is projected.

FIGS. 3A and 3B are diagrams illustrating an example of the space model MD onto which an input image is projected. FIG. 3A illustrates a relationship between the running body 61 and the space model MD when viewing the running body 61 from the side. FIG. 3B illustrates a relationship between the running body 61 and the space model MD when viewing the running body 61 from above.

As illustrated in FIGS. 3A and 3B, the space model MD has a cylindrical shape, and has a flat surface area R1 inside of its bottom surface and a curved surface area R2 inside of its side surface.

Figure 4:
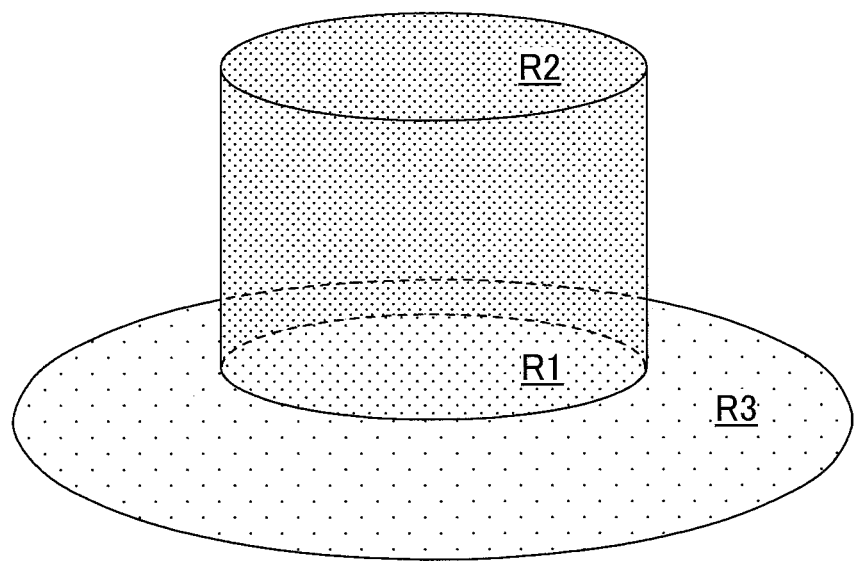
FIG. 4 is a diagram illustrating an example of a relationship between the space model and a processing-target image plane.

FIG. 4 is a diagram illustrating an example of a relationship between the space model MD and the processing-target image plane R3 The processing-target image plane R3 is, for example, a plane including the flat surface area R1 of the space model MD. Also, the processing-target image plane R3 may be a circular area, including the flat surface area R1 of the space model MD as described above, or may be an annular area not including the flat surface area R1 of the space model MD.

Next, various functional elements in the control device 1 will be described.

The coordinates-associating part 10 is a means for associating coordinates on the input image plane on which the input image taken by the camera 2 is positioned, coordinates on the space model MD, and coordinates on the processing-target image plane R3 In the present embodiment, the coordinates-associating part 10 associates, for example, the coordinates on the input image plane, the coordinates on the space model MD, and the coordinates on the processing-target image plane R3 based on various parameters relating to the camera 2, which are preconfigured or dynamically input, and a preconfigured mutual positional relationship between the input image plane, the space model MD and the processing-target image plane R3 Also, various parameters relating to the camera 2 are, for example, an optical center, a focal distance, a CCD size, an optical axis direction vector, a camera, horizontal direction vector, a projection system, etc., of the camera 2. Then, the coordinates-associating part 10 stores correspondence relationships between them in an input image/space model correspondence map 40 and a space model/processing-target image correspondence map 41.

However, when the coordinates-associating part 10 does not create a processing-target image, the coordinates-associating part 10 omits associating coordinates on the space model MD with coordinates on the processing-target image plane R3 and omits storing their correspondence relationship into the space model/processing-target image correspondence map 41.

The image creating part 11 is a means for creating an output image. In the present embodiment, the image creating part 11 associates coordinates on the processing-target image plane R3 with coordinates on the output image plane on which an output image is positioned by applying, for example, a scale conversion, an affine conversion, or a distortion conversion to a processing-target image. Then, the image creating part 11 stores their correspondence relationship into the processing-target image/output image correspondence map 42 of the storage device 4. Then, the image creating part 11 creates an output image by relating a value of each pixel in the output image to a value of each pixel in the input image while referring to the input image/space model correspondence map 40 and the space model/processing-target image correspondence map 41. The value of each pixel is, for example, a brightness value, a color phase value, a chroma value, etc.

For example, the image creating part 11 associates the coordinates on the processing-target image plane R3 with the coordinates on the output image plane on which the output image is positioned, based on various parameters of a virtual camera that are preconfigured or dynamically input. The various parameters relating to the virtual camera are, for example, an optical center, a focal distance, a CCD size, an optical direction axis vector, a camera horizontal direction vector, a projection system, etc., of the virtual camera. Then, the image creating part 11 stores their correspondence relationship into the processing-target image/output image correspondence map 42 of the storage device 4. Then, the image creating part 11 creates an output image by relating a value of each pixel in the output image to a value of each pixel in the input image while referring to the input image/space model correspondence map 40 and the space model/processing-target image correspondence map 41.

Also, the image creating part 11 may create an output image by changing a scale of a processing-target image without using a concept of a virtual camera.

Moreover, when the image creating part 11 does not create a processing-target image, the image creating part 11 associates coordinates on the space model MD with coordinates on the output image plane in accordance with the image conversion process applied. Then, the image creating part 11 creates an output image by relating a value of each pixel in the output image to a value of each pixel in an input image while referring to the input image/space model correspondence map 40. In this case, the image creating part 11 omits associating coordinates on the processing-target image plane R3 with the coordinates on the output image plane and also omits storing their correspondence relationship into the processing-target image/output image correspondence map 42.

The image adjusting part 12 is a means for adjusting an output image created by the image creating device 100. In the present embodiment, the image adjusting part 12 derives for each input image a re-projection line (described later) joining a coordinate on the space model MD corresponding to an image representing a predetermined feature in an input image and a coordinate on the processing-target image plane R3 corresponding to the coordinate on the space model MD. Then, the image adjusting part 12 adjusts a processing-target image by determining for each input image a slope of the re-projection line (for example, an angle to a vertical line, hereinafter referred to as "re-projection angle"). Also, the image adjusting part 12 determines for each input image a re-projection angle so as to equalize distances between each coordinate on the processing-target image plane R3 corresponding to an image representing a predetermined feature in each input image and a re-projection axis (described later) of the space model MD. Also, "an image representing a predetermined feature in each input image" is an image representing a feature that may extend over each input image, for example, including an image representing an infinity line such as a horizon, a sea horizon, etc., an image representing a line horizontally drawn on a wall surface around the jib crane 60, an image representing a line drawn on a road surface, or the like. Also, an adjustment of a processing-target image by the image adjusting part 12 will be described later in detail.

Next, an example of a specific process by the coordinates-associating part 10 and the image creating part 11 will be described.

For example, the coordinates-associating part 10 can associate coordinates on an input image plane with coordinates on a space model by using the Hamilton's quaternion.

Figure 5:
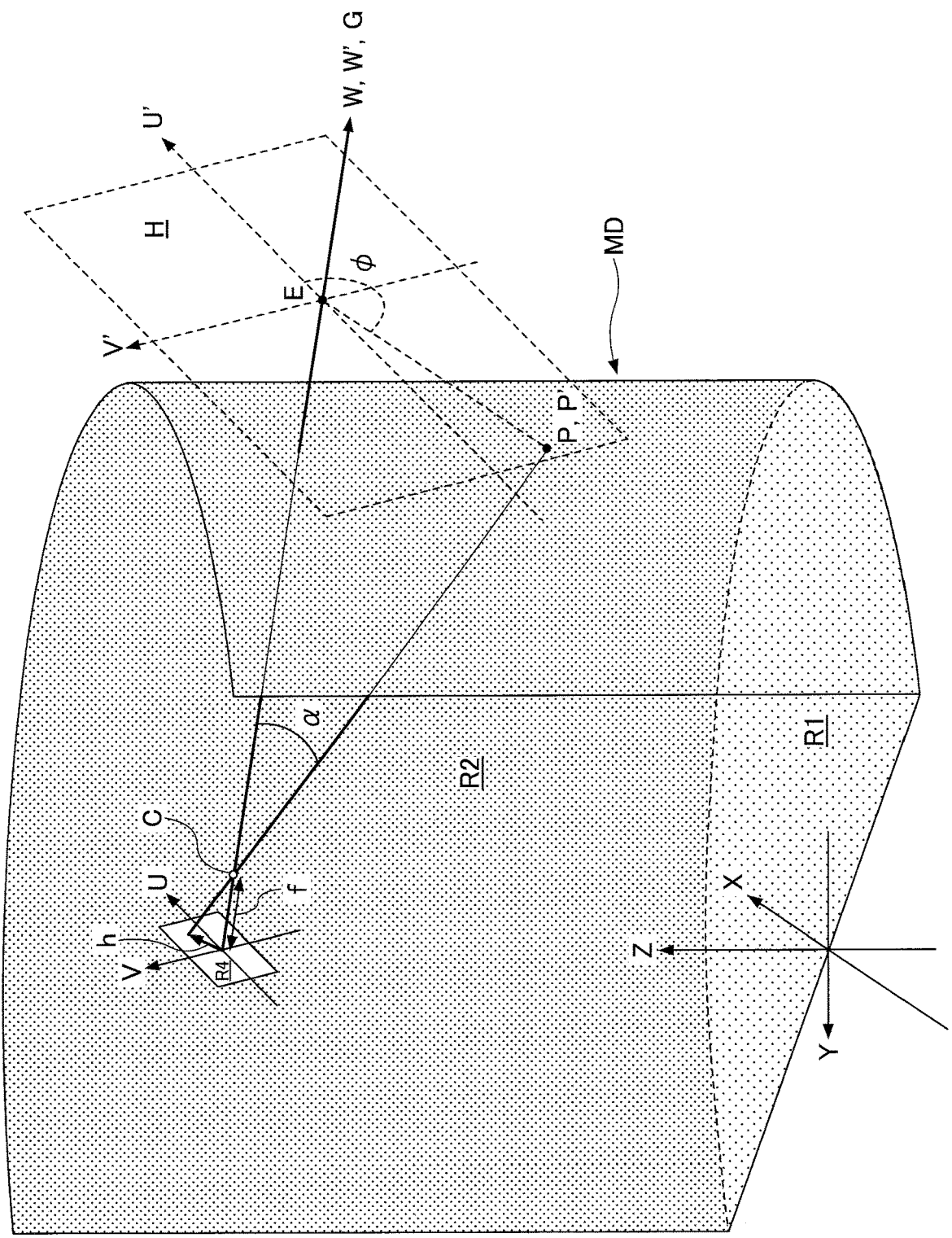
FIG. 5 is a diagram illustrating a correspondence between coordinates on an input image plane and coordinates on a space model.

FIG. 5 is a diagram, illustrating a correspondence between coordinates on the input image plane and coordinates on the space model. The input image plane of the camera 2 is expressed as a single plane in a UVW rectangular coordinate system having an optical center C of the camera 2 as an origin. The space model is expressed as a steric surface in an XYZ rectangular coordinate system.

First, the coordinates-associating part 10 translates the origin of the XYZ coordinate system, to the optical center C (the origin of the UVW coordinate system), and then rotates the XYZ coordinate system so as to align X-axis, Y-axis, Y-axis with U-axis, V-axis, W-axis, respectively. This is to convert coordinates on the space model (coordinates on the XYZ coordinate system) into coordinates on the input image plane (coordinates on the WW coordinate system). It should, be noted that the sign "−" of the "−W-axis" means that the direction of the Z-axis is opposite to the direction of the −W-axis. This is because a front direction of a camera corresponds to a +W direction in the UVW coordinate system and a downward vertical direction corresponds to a −Z direction in the XYZ coordinate system.

If there is a plurality of cameras 2, each of the cameras 2 has an individual UVW coordinate system. Thereby, the coordinates-associating part 10 translates and rotates the XYZ coordinate system with respect to each of the plurality of UVW coordinate systems.

The above-mentioned conversion is realized by translating the XYZ coordinate system, so that the optical center C of the camera 2 becomes the origin of the XYZ coordinate system, and thereafter, rotating the XYZ coordinate system so that the X-axis coincides with the −W-axis and further rotating the XYZ coordinate system so that the X-axis coincides with the U-axis. Therefore, the coordinates-associating part 10 can integrate the two rotation operations into a single rotation operation by describing the conversion by Hamilton's quaternion.

By the way, a rotation to align a certain vector A with a different vector B corresponds to a process of rotating a normal line of a plane defined by the vector A and the vector B around the normal line as an axis by an angle formed between the vector A and the vector B. When the angle is set to θ, the angle θ is expressed by an inner product of the vector A and the vector B as:

$$\theta = \cos^{-1}\left(\frac{A \cdot B}{|A||B|}\right) \quad \text{[Formula 1]}$$

Moreover, the unit vector N of the normal line of the plane defined by the vector A and the vector B is expressed by an outer product of the vector A and the vector B as:

$$N = \frac{A \times B}{|A||B|\sin\theta} \quad \text{[Formula 2]}$$

It should be noted that when each of i, j and k is an imaginary number unit, the quaternion is a hyper complex number satisfying:

$$ii=jj=kk=ijk=-1 \quad \text{[Formula 3]}$$

and in the present embodiment, the quaternion Q is expressed as follows, where a real component is t and pure imaginary components are a, b and c:

$$Q=(t; a, b, c)=t+ai+bj+ck \quad \text{[Formula 4]}$$

and the conjugate quaternion of the quaternion Q is expressed as:

$$Q^*=(t;-a,-b,-c)=t-ai-bj-ck \quad \text{[Formula 5]}$$

The quaternion Q can express a three-dimensional vector (a, b, c) by the pure imaginary components a, b and c while setting the real component t to 0 (zero). In addition, the quaternion Q can express a rotating operation around an arbitrary vector as an axis by using respective components t, a, b and c.

Further, the quaternion Q can express consecutive rotating operations as a single rotating operation by integrating the rotating operations. Specifically, the quaternion Q can express, for example, a point D (ex, ey, ez), which is obtained by rotating an arbitrary point S (sx, sy, sz) around an arbitrary unit vector C (l, m, n) as an axis by an angle θ, as follows.

$$D = (0; ex, ey, ez) = QSQ^* \quad \text{[Formula 6]}$$
$$\text{where, } S = (0; sx, sy, sz),$$
$$Q = \left(\cos\frac{\theta}{2}; l\sin\frac{\theta}{2}, m\sin\frac{\theta}{2}, n\sin\frac{\theta}{2}\right)$$

Here, in the present embodiment, when the quaternion expressing a rotation, which aligns the Z-axis with the −W-axis, is $Q_z$, the point X on the X-axis in the XYZ coordinate system is moved to a point X'. Therefore, the point X' is expressed by:

$$X'=Q_zXQ_z^* \quad \text{[Formula 7]}$$

Moreover, in the present embodiment, when, the quaternion expressing a rotation, which aligns a line joining the point X' on the X-axis and the origin with the U-axis, is $Q_x$, the quaternion R expressing "a rotation to align the Z-axis with the −W-axis and further align the X-axis with the U-axis" is expressed by:

$$R=Q_xQ_z \quad \text{[Formula 8]}$$

Thus, when an arbitrary coordinate P on the space model (the XYZ coordinate system) is represented as a coordinate P' on the input image plane (the UVW coordinate system), the coordinate P' is expressed by:

$$P'=RPR^* \quad \text{[Formula 9]}$$

Additionally, due to the fact that the quaternion R remains unchanged in each of the cameras 2, the coordinates-associating part 10 can convert a coordinate on the space model (the XYZ coordinate system) into a coordinate on the input image plane (the UVW coordinate system) by just performing this operation.

After converting a coordinate on the space model (the XYZ coordinate system) to a coordinate on the input image plane (the UVW coordinate system), the coordinates-associating part 10 computes an incident angle α formed by a line segment CP' and the optical axis G of the camera 2, The line segment CP' is a line segment joining the optical center C (a coordinate on the UVW coordinate system) of the camera 2 and a coordinate P' on the UVW coordinate system corresponding to an arbitrary coordinate P on the space model.

Moreover, the coordinates-associating part 10 computes an argument φ and a length of a line segment EP' on a plane H which is parallel to the input image plane R4 (for example, a CCD plane) of the camera 2 and includes the coordinate P'. The line segment EP' is a line segment joining an intersection point E of the plane H with an optical axis G and the coordinate P'. The argument φ is an angle formed by a U' axis on the plane H and the line segment EP'.

In an optical system of a camera, normally, an image height h is a function of an incident angle α and a focal distance f. Accordingly, the coordinates-associating part 10 computes the image height h by selecting an appropriate projection system such as a normal projection (h=ftanα), an orthogonal projection (h=fsinα), a stereographic projection (h=2 ftan(α/2)), an equisolid angle projection (h=fsin(aα/2)), an equidistant projection (h=fα), etc.

Thereafter, the coordinates-associating part 10 decomposes the computed image height h to a U-component and a V-component on the UV coordinate system according to an argument ϕ, and divides them by a numerical value corresponding to a pixel size per one pixel of the input image plane R4. Thereby, the coordinates-associating part 10 can associate the coordinate P (P') on the space model MD with the coordinate on the input image plane R4.

It should be noted that when the pixel size per one pixel in the U-axis direction of the input image plane R4 is set to $a_U$, and the pixel size per one pixel in the V-axis direction of the input image plane R4 is set to $a_V$, a coordinate (u, v) on the input image plane R4 corresponding to the coordinate P (P') on the space model MD is expressed by:

$$u = \frac{h\cos\phi}{a_U} \quad \text{[Formula 10]}$$

$$v = \frac{h\sin\phi}{a_V} \quad \text{[Formula 11]}$$

In this way, the coordinates-associating part 10 associates coordinates on the space model MD with coordinates on one or more input image planes R4 existing for each camera, and relates the coordinates on the space model MD, a camera identifier, and the coordinates on the input image plane R4, and stores their correspondence relationship into the input image/space model correspondence map 40.

Because the coordinates-associating part 10 operates the conversion of coordinates by rising the quaternion, the coordinates-associating part 10 provides an advantage in that a gimbal lock is not generated unlike a case where a conversion of coordinates is operated using the Euler angle. However, the coordinates-associating part 10 is not limited to a configuration that performs an operation of conversion of coordinates using the quaternion. The coordinates-associating part 10 may perform an operation of conversion of coordinates using the Euler angle.

If the coordinates-associating part 10 can associate the coordinate P (P') on the space model with coordinates on a plurality of input image planes R4, the coordinates-associating part 10 may associate the coordinates P (P') with a coordinate on an input image plane R4 of a camera having the smallest incident angle α, or may associate the coordinate P (P') with a coordinate on an input image plane R4 selected by an operator.

Next, a process of re-projecting a coordinate on the curved surface area R2 (a coordinate having a component in a Z-axis direction) out of coordinates on the space model MD, onto the processing-target image plane R3 on the XY plane will be described.

Figure 6A:
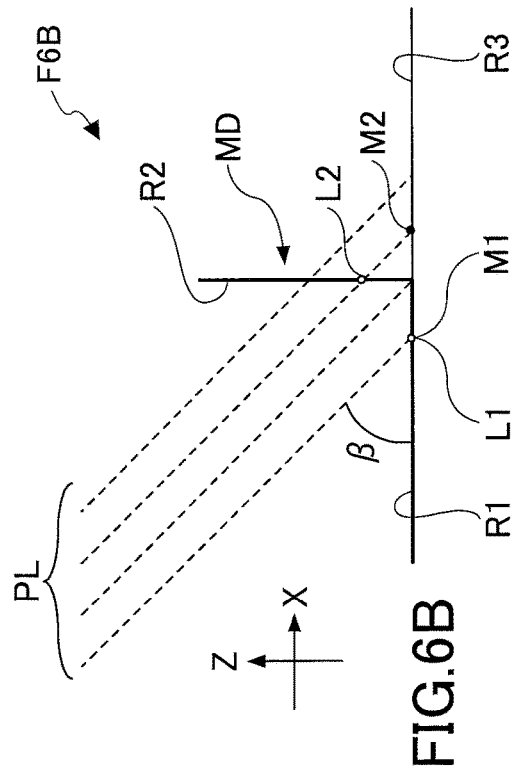
FIG. 6A is an illustration illustrating a correspondence relationship between coordinates on the input image plane by a camera using a normal projection and coordinates on the space model.

FIGS. 6A through 6D are diagrams illustrating a correspondence between coordinates associated by the coordinates-associating part 10. FIG. 6A is a diagram illustrating a correspondence relationship between coordinates on the input image plane R4 of the camera 2 using a normal projection (h=ftanα) as an example and coordinates on the space model MD. The coordinates-associating part 10 associates both coordinates with each other by causing each line segment, which joins a coordinate on the input image plane R4 of the camera 2 and a coordinate on the space model MD corresponding to the coordinate on the input image plane R4, passes through the optical center C of the camera 2.

In the example of FIG. 6A, the coordinates-associating part 10 associates a coordinate K1 on the input image plane R4 of the camera 2 with a coordinate L1 on the flat surface area. R1 of the space model MD, and associates a coordinate K2 on the input image plane R4 of the camera 2 with a coordinate L2 on the curved surface area R2 of the space model MD. In this situation, both a line segment K1-L1 and a line segment K2-L2 pass through the optical center C of the camera 2.

It should be noted that when the camera 2 uses projection systems (for example, an orthogonal projection, a stereographic projection, an equisolid angle projection, an equidistant projection, etc.) other than the normal projection system, the coordinates-associating part 10 associates the coordinates K1 and K2 on the input image plane R4 with the coordinates L1 and L2 on the space model MD according to the respective projection systems.

Specifically, the coordinates-associating part 10 associates the coordinates on the input image plane with the coordinates on the space model MD based on a predetermined function (for example, an orthogonal projection (h=fsinα), a stereographic projection (h=2 ftan(α/2)), an equisolid angle projection (h=fsin(α/2)), an equidistant projection (h=fα), etc.). In this case, the line segment K1-L1 and the line segment K2-L2 do not pass through the optical center C of the camera 2.

Figure 6B:
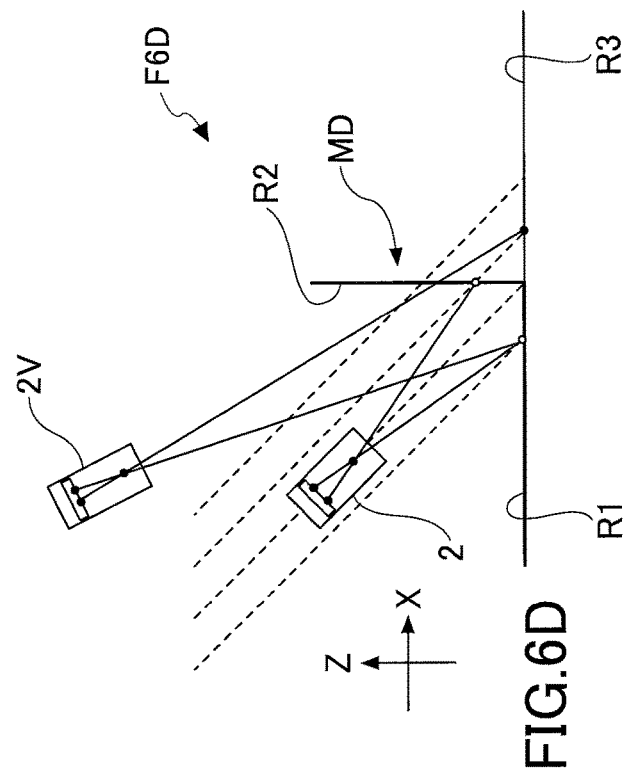
FIG. 6B is an illustration illustrating a correspondence relationship between coordinates on a curved surface area of the space model and coordinates on a processing-target image plane.

FIG. 6B is a diagram illustrating a correspondence relationship between coordinates on the curved surface area R2 of the space model MD and coordinates on the processing-target image plane R3 The coordinates-associating part 10 introduces parallel lines PL, which are parallel lines positioned on the XZ-plane and form an angle β with the processing-target image plane R3 Then, the coordinates-associating part 10 associates both coordinates with each other so that both the coordinates on the curved surface area R2 of the space model MD and the coordinates on the processing-target image plane R3 corresponding to the coordinates on the curved surface area R2 are positioned on one of the parallel lines PL.

In the example of FIG. 6B, due to the fact that the coordinate L2 on the curved surface area R2 of the space model MD and a coordinate M2 on the processing-target image plane R3 are positioned, on a common parallel line, the coordinates-associating part 10 associates both coordinates with each other.

Also, the coordinates-associating part 10 can associate coordinates on the flat surface area R1 of the space model MD with coordinates on the processing-target image plane R3 using the parallel lines PL, similar to the coordinates on the curved surface area R2. However, in the example of FIG. 6B, the flat surface area R1 and the processing-target image plane R3 lie on a common plane. Therefore, the coordinate L1 on the flat surface area R1 on the space model MD and the coordinate M1 on the processing-target image plane R3 have the same coordinate value.

In this way, the coordinates-associating part 10 associates coordinates on the space model MD with coordinates on the processing-target image plane R3 and stores the coordinates on the space model MD and the coordinates on the processing-target image R3 in a linked relation into the space model/processing-target image correspondence map 41.

Figure 6C:
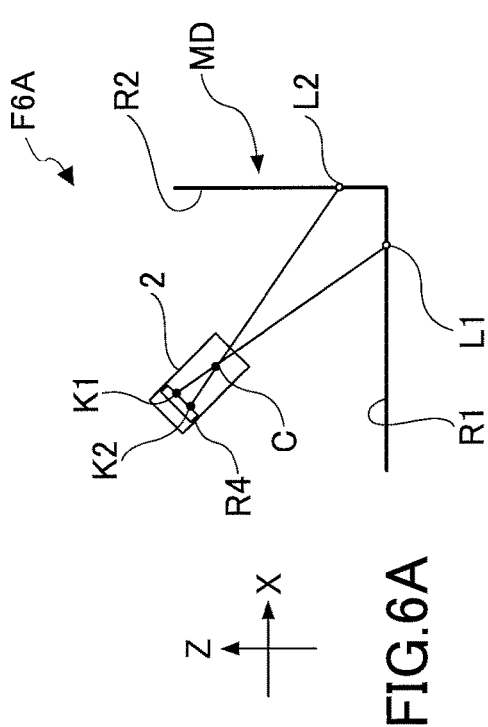
FIG. 6C is an illustration illustrating a correspondence relationship between coordinates on a processing-target image plane and coordinates on an output image plane of a virtual camera.

FIG. 6C is a diagram illustrating a correspondence relationship between coordinates on the processing-target image plane R3 and coordinates on the output image plane R5 of a virtual camera 2V using, as an example, a normal projection (h=ftanα). The image creating part 11 associates both coordinates with each other so that each line segment, which joins a coordinate on the output image plane R5 of the virtual camera 2V and a coordinate on the processing-target image plane R3 corresponding to the coordinate on the output image plane R5, passes through the optical center CV of the virtual camera 27.

In the example of FIG. 6C, the image creating part 11 associates a coordinate N1 on the output image plane R5 of the virtual camera 2V with the coordinate M1 on the processing-target image plane R3 (the flat surface area R1 of the space model MD), and associates a coordinate N2 on the output image plane R5 of the virtual camera 2V with the coordinate M2 on the processing-target image plane R3 In this situation, both a line segment M1-N1 and a line segment M2-N2 pass through the optical center CV of the virtual camera 2V.

If the virtual camera 2V uses projection systems (for example, an orthogonal projection, a stereographic projection, an equisolid angle projection, an equidistant projection, etc) other than the normal projection, the image creating part 11 associates the coordinates N1 and N2 on the output image plane R5 of the virtual camera 2V with the coordinates M1 and M2 on the processing-target image plane R3 according to the respective projection systems.

Specifically, the image creating part 11 associates the coordinates on the output image plane R5 with the coordinates on the processing-target image plane R3 based on a predetermined function (for example, an orthogonal projection (h=fsinα), a stereographic projection (h=2 ftan(α/2)), an equisolid angle projection (h=fsin(α/2)), an equidistant projection (h=fα), etc.). In this case, the line segment M1-N1 and the line segment M2-N2 do not pass through the optical center CV of the virtual camera 2V.

In this way, the image creating part 11 associates the coordinates on the output image plane R5 with the coordinates on the processing-target image plane R3 and stores the coordinates on the output image plane R5 and the coordinates on the processing-target image R3 in a linked relation into the processing-target image/output image correspondence map 42. Then, the image creating part 11 creates an output image by relating a value of each pixel in the output image to a value of each pixel in the input image while referring to the input image/space model correspondence map 40 and the space model/processing-target image correspondence map 41.

Figure 6D:
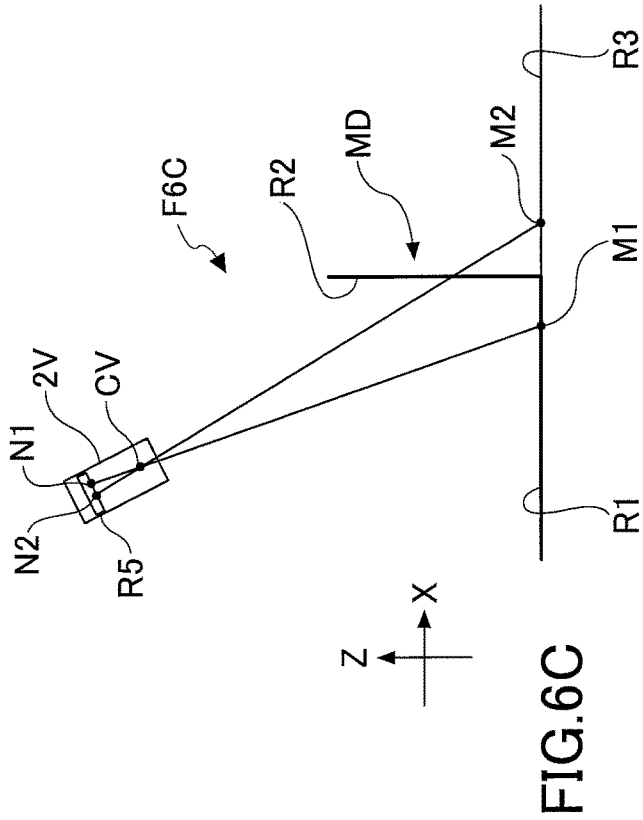
FIG. 6D is an illustration illustrating a mutual positional relationship between the camera, the virtual camera, the flat surface area and curved surface area of the space model, and the processing-target image plane.

Also, FIG. 6D is a combination of FIGS. 6A~6C, and illustrates a mutual positional relationship between the camera 2, the virtual camera 2V, the flat surface area R1 and the curved surface area R2 of the space model MD, and the processing-target image plane R3.

Next, with reference to FIGS. 7A and 7B, an action of the parallel lines PL, which the coordinates-associating part 10 introduces to associate coordinates on the space model MD with coordinates on the processing-target image plane R3 will be described.

Figure 7A:
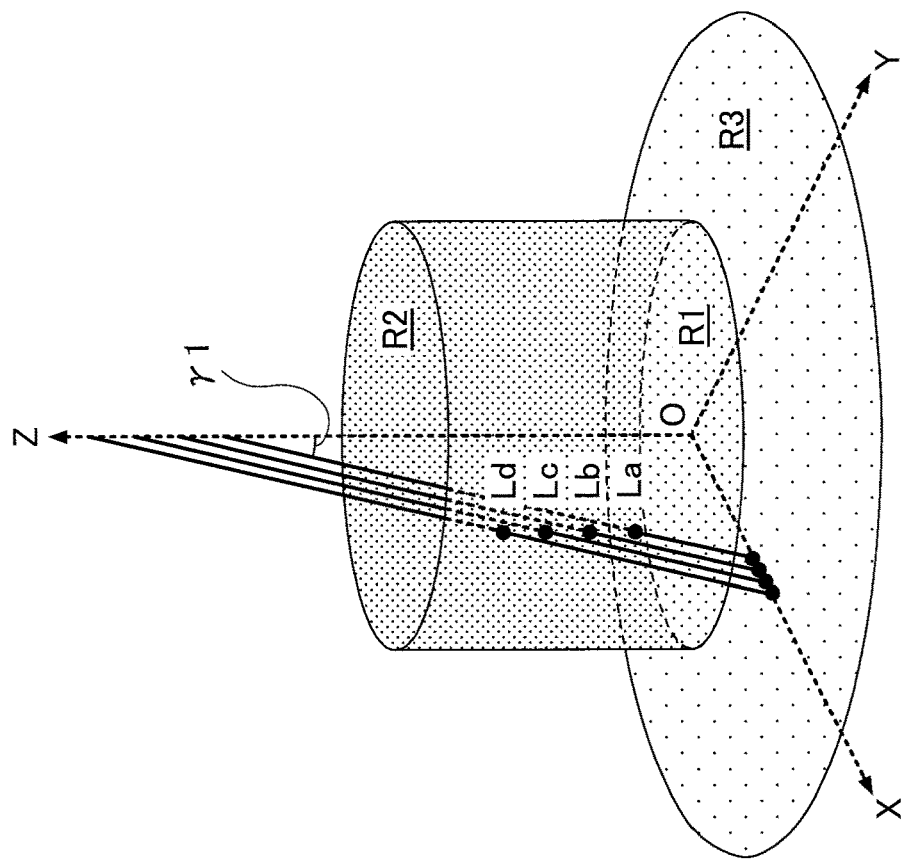
FIG. 7A is an illustration of a case where an angle is formed, between parallel, lines positioned on an XZ-plane and Z-axis.

FIG. 7A is a diagram of a case where an angle γ is formed between the parallel lines PL positioned on the XZ-plane and the Z-axis. FIG. 7B is a diagram of a case where an angle γ1 (γ1<γ)is formed between the parallel lines PL positioned on the XZ-plane and the Z-axis. Also, coordinates La~Ld on the curved surface area R2 of the space model MD in FIGS. 7A and 7B correspond to coordinates Ma~Md on the processing-target image plane R3 respectively. Intervals of the coordinates La~Ld in FIG. 7A are equal to intervals of the coordinates La~Ld in FIG. 7B, respectively. Although it is assumed that the parallel lines PL are supposed to be on the XZ-plane for the purpose of simplification of description, actually, the parallel lines radially extend from all points on the Z-axis toward the processing-target image plane R3 The Z-axis in this case is referred to as "re-projection axis".

Figure 7B:
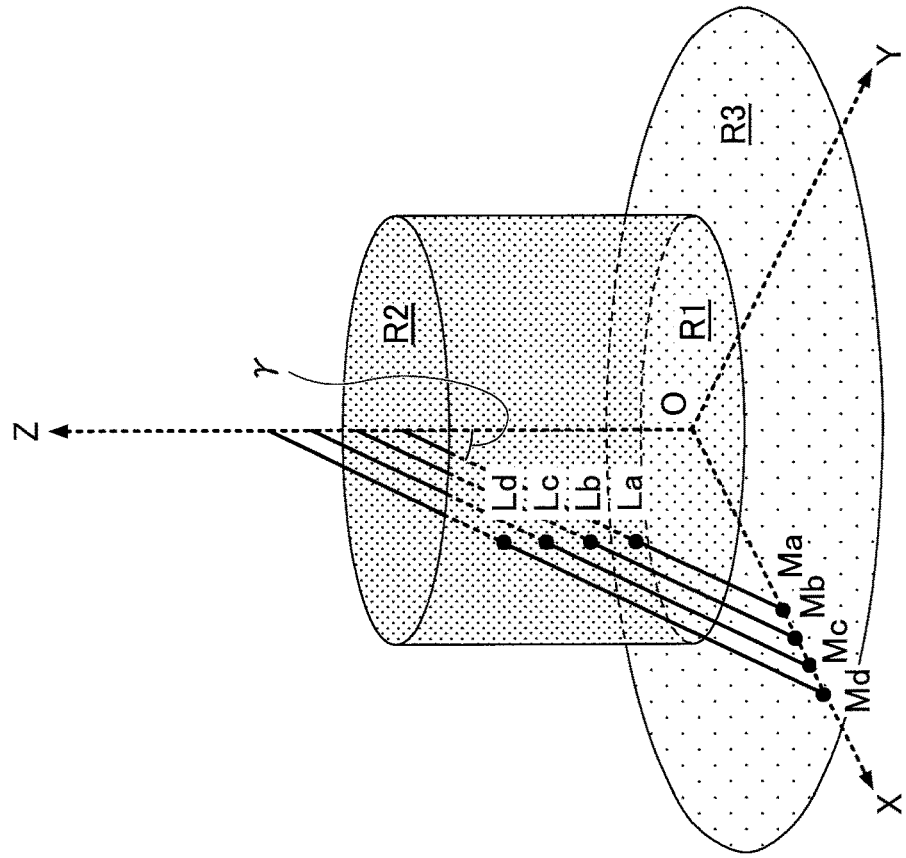
FIG. 7B is an illustration of a case where a different angle is formed between the parallel lines positioned on the XZ-plane and the Z-axis.

As illustrated in FIGS. 7A and 7B, the intervals of the coordinates Ma~Md on the processing-target image plane R3 decease linearly with decrease in the angle γ between the parallel lines PL and the re-projection axis. That is, the intervals of the coordinates Ma~Md decrease uniformly irrespective of the distance between the curved surface area R2 of the space model MD end each of the coordinates Ma~Md. On the other hand, in the example illustrated in FIGS. 7A and 7B, coordinates on the flat surface area R1 of the space model MD are not converted to coordinates on the processing-target image plane R3 Thus, intervals of the coordinates on the flat surface area R1 of the space model MD do not change.

The change in the intervals of these coordinates means that only an image part corresponding to the image projected on the curved surface area R2 of the space model MD, out of image parts on the output image plane R5 (refer to FIG. 6C), is enlarged or reduced linearly.

Next, with reference to FIGS. 8A and 8B, an alternative example of the parallel lines PL, which the coordinates-associating part 10 introduces to associate coordinates on the space model MD with coordinates on the processing-target image plane R3.

FIG. 8A is a diagram of a case where all of auxiliary lines AL as re-projection lines positioned on the XZ-plane extend from a start point T1 on the Z-axis toward the processing-target image plane R3 On the other hand, FIG. 8B is a diagram of a case where all of the auxiliary lines AL extend from a start point T2 (T2>T1) on the Z-axis toward the processing-target image plane R3. Also, coordinates La~Ld on the curved surface area R2 of the space model MD in FIGS. 8A and 8B correspond to coordinates Ma~Md on the processing-target image plane R3 respectively. In the example in FIG. 8A, coordinates Mc and Md are not shown because they are out of range of the processing-target image plane R3 Additionally, intervals of the coordinates La~Ld in FIG. 8A are equal to intervals of the coordinates La~Ld in FIG. 8B, respectively. Although it is assumed that the auxiliary lines AL are supposed to be on the XZ-plane for the purpose of simplification of description, actually, the auxiliary lines radially extend from an arbitrary point on the Z-axis toward the processing-target image plane R3. Similar to the example illustrated in FIGS. 7A and 7B, the Z-axis in this case is referred to as "re-projection axis".

As illustrated, in FIGS. 8A and 8B, the intervals of the coordinates Ma~Md on the processing-target image plane R3 decease nonlinearly with increase in a distance (height) between the start point of the auxiliary lines AL and the origin O. That is, a degree of decrease of each interval increases with increase in a distance between the curved surface area R2 or the space model MD and each of the coordinates Ma~Md. On the other hand, in the example illustrated in FIGS. 8A and 8B, coordinates on the flat surface area R1 of the space model MD are not converted to coordinates on the processing-target image plane R3 Thus, the intervals of the coordinates on the flat surface area R1 of the space model MD do not change.

Similar to the case of the parallel lines PL, the change in these intervals of the coordinates means that only an image part corresponding to the image projected on the curved surface area R2 of the space model MD, out of image parts on the output image plane R5 (refer to FIG. 6C), is enlarged or reduced nonlinearly.

In this way, the image creating device 100 can linearly or nonlinearly enlarge or reduce an image part (for example, a horizontal image) of the output image corresponding to an image projected on the curved surface area R2 of the space model MD without affecting an image part (for example, a road surface image) of the output image corresponding to an image projected on the flat surface area R1 of the space model MD. Thereby, the image creating device 100 can rapidly and flexibly enlarge or reduce an object positioned around the running body 61 (an object in an image of surroundings in a horizontal direction viewed from the running body 61) without affecting a road surface image (a virtual image of the running body 61 viewed from directly above) in the vicinity of the running body 61, and can improve visibility of a blind area created by jib crane 60.

Figure 9:
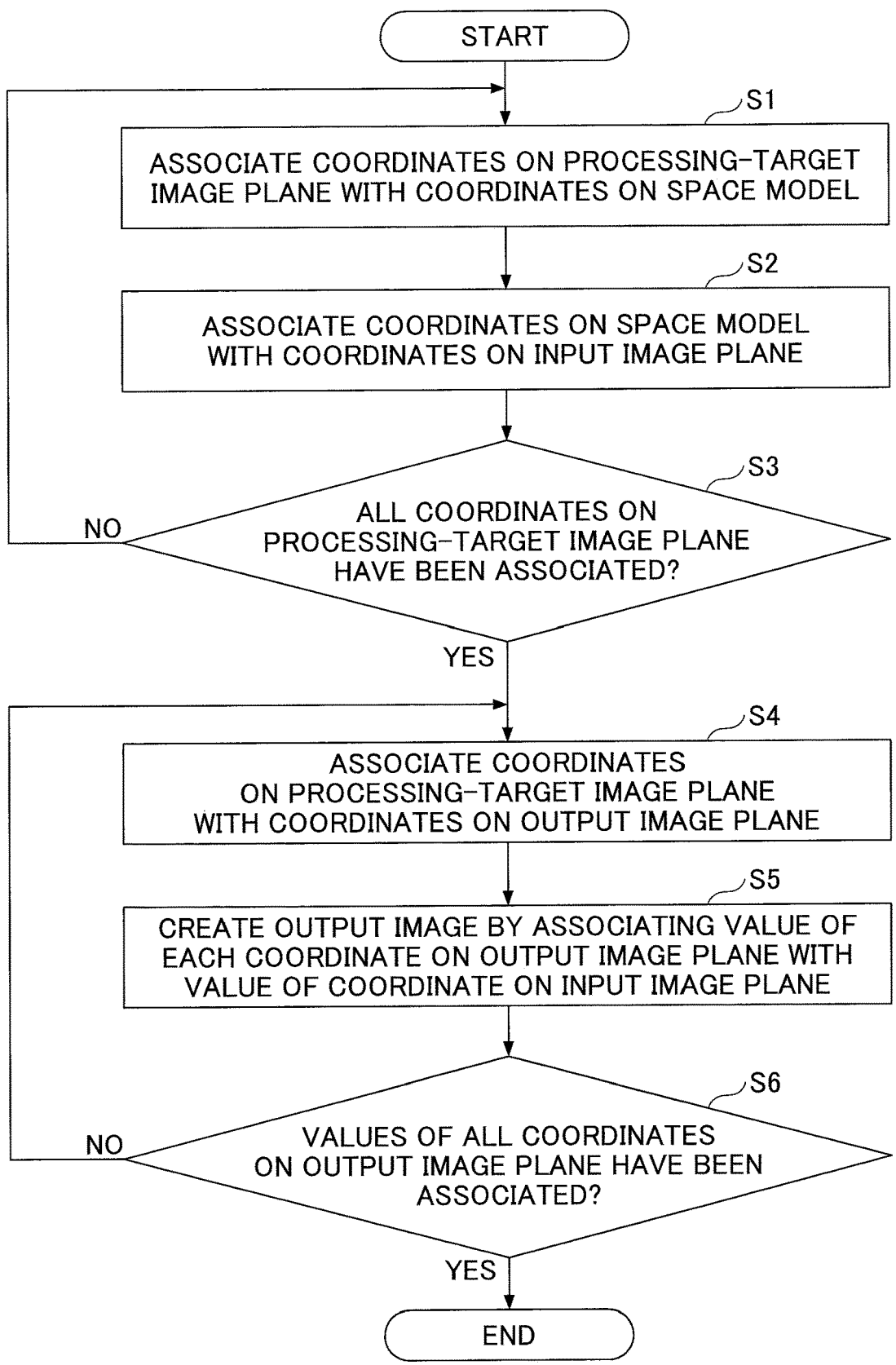
FIG. 9 is a flowchart illustrating a flow of a processing-target image creating process and an output image creating process.

Next, with reference to FIG. 9, a process in which the image creating device 100 creates a processing-target image (hereinafter, referred to as "processing-target image creating process") and a process in which the image creating device 100 creates an output image using the created processing-target image (hereinafter, referred to as "output image creating process") will be described. FIG. 9 is a flowchart illustrating a flow of the processing-target creating process (step S1~step S3) and the output image creating process (step S4~step S6). Also, the arrangement of the camera 2 (the input image plane R4), the space model (the flat surface area R1 and the curved surface area R2) and the processing-target image plane R3 is preconfigured.

First, the coordinates-associating part 10 in the control device 1 associates coordinates on the processing-target image plane R3 with coordinates on the space model MD (step S1).

Specifically, the coordinates-associating part 10 acquires a re-projection angle formed between the parallel lines PL and the re-projection axis. Then the coordinates-associating part 10 computes a point at which one of the parallel lines PL extending from a coordinate on the processing-target image plane R3 intersects with the curved surface area R2 of the space model MD. Then, the coordinates-associating part 10 derives a coordinate on the curved surface area R2 corresponding to the computed point as a coordinate on the curved surface area. R2 corresponding to the very coordinate on the processing-target image plane R3 and stores its correspondence relationship into the space model/processing-target image correspondence map 41. In the present embodiment, the re-projection angle formed between the parallel lines PL and the re-projection axis is a value determined for each camera (for each input image) by image adjusting part 12. Also, the re-projection angle may be a value previously stored in the storage device 4, etc., or may foe a value dynamically input by an operator through an input part.

When a coordinate on the processing-target image plane R3 coincides with a coordinate on the flat surface area R1 on the space model MD, the coordinates-associating part 10 derives the coordinate on the flat surface area R1 as a coordinate corresponding to the coordinate on the processing-target image plane R3 and stores its correspondence relationship into the space model/processing-target image correspondence map 41.

Thereafter, the coordinates-associating part 10 in the control device 1 associates the coordinate on the space model MD derived by the above mentioned process with a coordinate on the input image plane R4 (step S2).

Specifically, the coordinates-associating part 10 acquires a coordinate of the optical center C of the camera 2 using a normal projection (h=ftanα). Then, the coordinates-associating part 10 computes a point at which a line segment, which extends from a coordinate on the space model MD and passes through the optical center C, intersects with the input image plane R4. Then, the coordinates-associating part 10 derives a coordinate on the input image plane R4 corresponding to the computed point as a coordinate on the input image plane R4 corresponding to the coordinate on the space model MD, and stores its correspondence relationship into the input image/space model correspondence map 40.

Thereafter, the control device 1 determines whether or not the control, device 1 has associated all coordinates on the processing-target image plane R3 with coordinates on the space model MD and coordinates on the input image plane R4 (step S3). Then, if the control device 1 has determined that it has not yet associated all coordinates (NO of step S3), the control device 1 repeats the process of step S1 and step S2.

On the other hand, if the control device 1 has determined that it has associated all coordinates (YES of step S3), the control device 1 terminates the processing-target image creating process, and then, starts the output image creating process. Then, the image creating part 11 in the control device 1 associates coordinates on the processing-target image plane R3 with coordinates on the output image plane R5 (step S4).

Specifically, the image creating part 11 creates an output image by applying a scale conversion, an affine conversion or a distortion conversion to a processing-target image. Then, the image creating part 11 stores a correspondence relationship between the coordinates on the processing-target image plane R3 and the coordinates on the output image plane R5 into the processing-target image/output image correspondence map 42. The correspondence relationship is set depending on the details of the applied scale conversion, affine conversion, or distortion conversion.

Alternatively, when the image creating part 11 creates an output image by using the virtual camera 2V, the image creating part 11 may compute coordinates on the output image plane R5 from coordinates on the processing-target image plane R3 depending on the adopted projection system, and may store its correspondence relationship into the processing-target image/output image correspondence map 42.

Alternatively, when the image creating part 11 creates an output image by using the virtual camera 2V using a normal projection (h=ftanα), the image creating part 11 acquires a coordinate of the optical center CV of the virtual camera 2V. Then, the image creating part 11 computes a point at which a line segment, which extends from a coordinate on the output image plane R5 and passes through the optical center CV, intersects with the processing-target image plane R3 Then, the image creating part 11 derives a coordinate on the processing-target image plane R3 corresponding to the computed point as a coordinate on the processing-target image plane R3 corresponding to the coordinate on the output image plane R5. In this way, the image creating part 11 may store its correspondence relationship into the processing-target image/output image correspondence map 42.

Thereafter, the image creating part 11 in the control device 1 refers to the input image/space model correspondence map 40, the space model/processing-target image correspondence map 41 and the processing-target image/output image correspondence map 42. Then, the image creating part 11 follows the correspondence relationship between the coordinates on the input image plane R4 and the coordinates on the space model MD, the correspondence relationship between the coordinates on the space model MD and the coordinates on the processing-target image plane R3 and the correspondence relationship between the processing-target image plane R3 and the coordinates on the output image plane R5 Then, the image creating part 11 acquires values (for example, a brightness value, a color phase value, a chroma value, etc.) indicated by the coordinates on the input image plane R4 corresponding to each coordinate on the output image plane R5, and uses the acquired values as values of each, coordinate on the corresponding output image plane R5 (step S5). If a plurality of coordinates on a plurality of input image planes R4 correspond to one coordinate on the output image plane R5, the image creating part 11 may derive a statistical value based on each value of the plurality of coordinates on the plurality of input image planes R4, and may use the statistical value as a value of the coordinate on the output image plane R5 The statistical value is, for example, a mean value, a maximum value, a minimum value, a median value, etc.

Thereafter, the control device 1 determines whether or not the control device 1 associates values of all coordinates on the output image plane R5 with values of coordinates on the input image plane R4 (step S6). If the control device 1 has determined that it has not yet associated values of all coordinates (NO of step S6), the control device 1 repeats the process of step 34 and step S5.

On the other hand, if the control, device 1 has determined that it has associated values of all coordinates (YES of step S6), the control device 1 creates an output image, and terminates series of processes.

If the image creating device 100 does not create a processing-target image, the image creating device 100 omits the processing-target image creating process. In this case, the "coordinates on the processing-target image plane" in step 34 of the output image creating process is substitutionally read as "coordinates on the space model".

According to the above-mentioned configuration, the image creating device 100 is capable of creating the processing-target image and the output image that can cause the operator to intuitively grasp the positional relationship between the running body 61 and a peripheral object of the running body 61.

Also, the image creating device 100 performs association of coordinates in such a way as to track back from the processing-target image plane R3 through the space model MD to the input image plane R4. Thereby, the image creating device 100 is capable of surely associating each coordinate on the processing-target plane R3 with one or more coordinates on the input image plane R4. Thus, the image creating device 100 can create a better quality processing-target image rapidly in comparison to performing association of coordinates in an order from the input image plane R4 through the space model MD to the processing-target image plane R3.

Also, even if the image creating device 100 performs association of coordinates in an order from the input image plane R4 through the space model MD to the processing-target image plane R3 the image creating device 100 can surely associate each coordinate on the input image plane R4 with one or more coordinates on the processing-target image plane R3 However, there may be a case where a part of the coordinates on the processing-target image plane R3 cannot be associated with any one of the coordinates on the input image plane R4. In such a case, if is necessary to apply an interpolation process to the part of the coordinates on the processing-target image plane R3.

Also, when the image creating device 100 enlarges or reduces only an image corresponding to the curved surface area R2 of the space model MD, the image creating device 100 can realize a desired enlargement or reduction by just rewriting only a part related to the curved surface area. R2 in the space model/processing-target image correspondence map 41 by changing the re-projection angle formed between the parallel lines PL and the processing-target image plane R3 without rewriting the contents of the input image/space model correspondence map 40.

Also, when the image creating device 100 changes an appearance of an output image, the image creating device 100 is capable of creating a desired output image (a scale conversion image, an affine conversion image or a distortion conversion image) by just rewriting the processing-target image/output image correspondence map 42 by changing various parameters regarding a scale conversion, an affine conversion or a distortion conversion, without rewriting the contents of the input image/space model correspondence map 40 and the contents of the space model/processing-target image correspondence map 41.

Figure 10C:
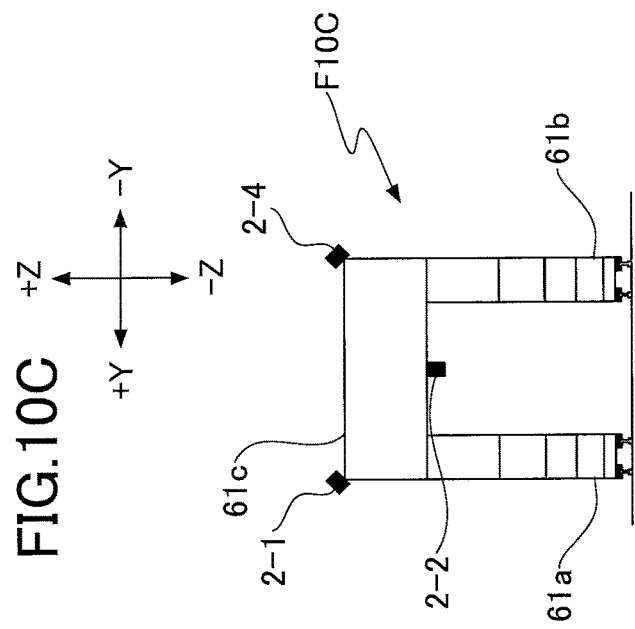
FIG. 10C is an arrangement plan (a front view) of eight cameras attached to a running body of the jib crane.
Figure 10A:
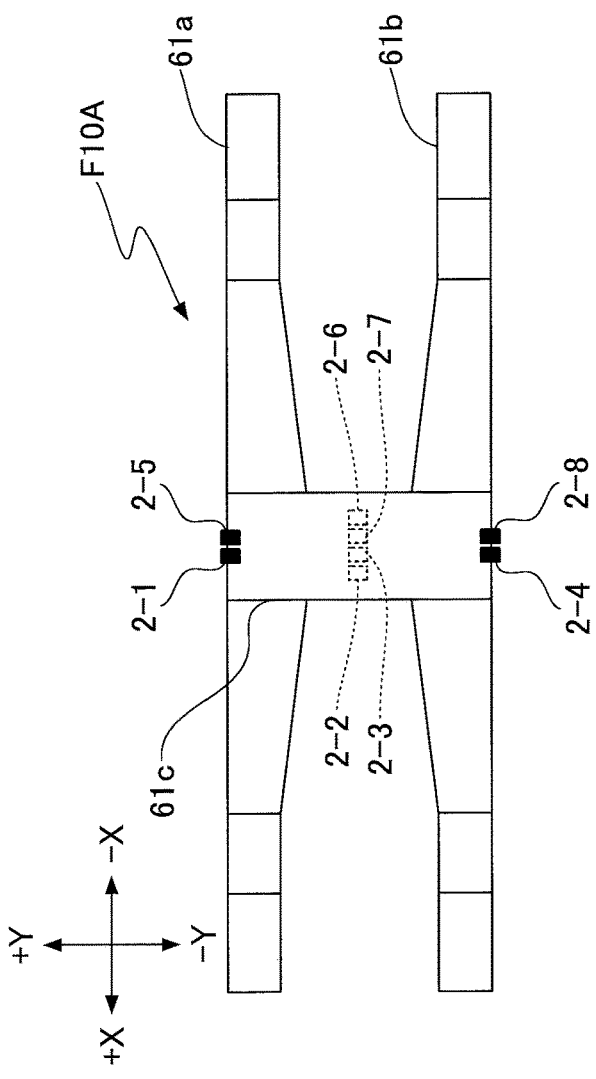
FIG. 10A is an arrangement plan (a top view) of eight cameras attached to a running body of the jib crane.
Figure 12:
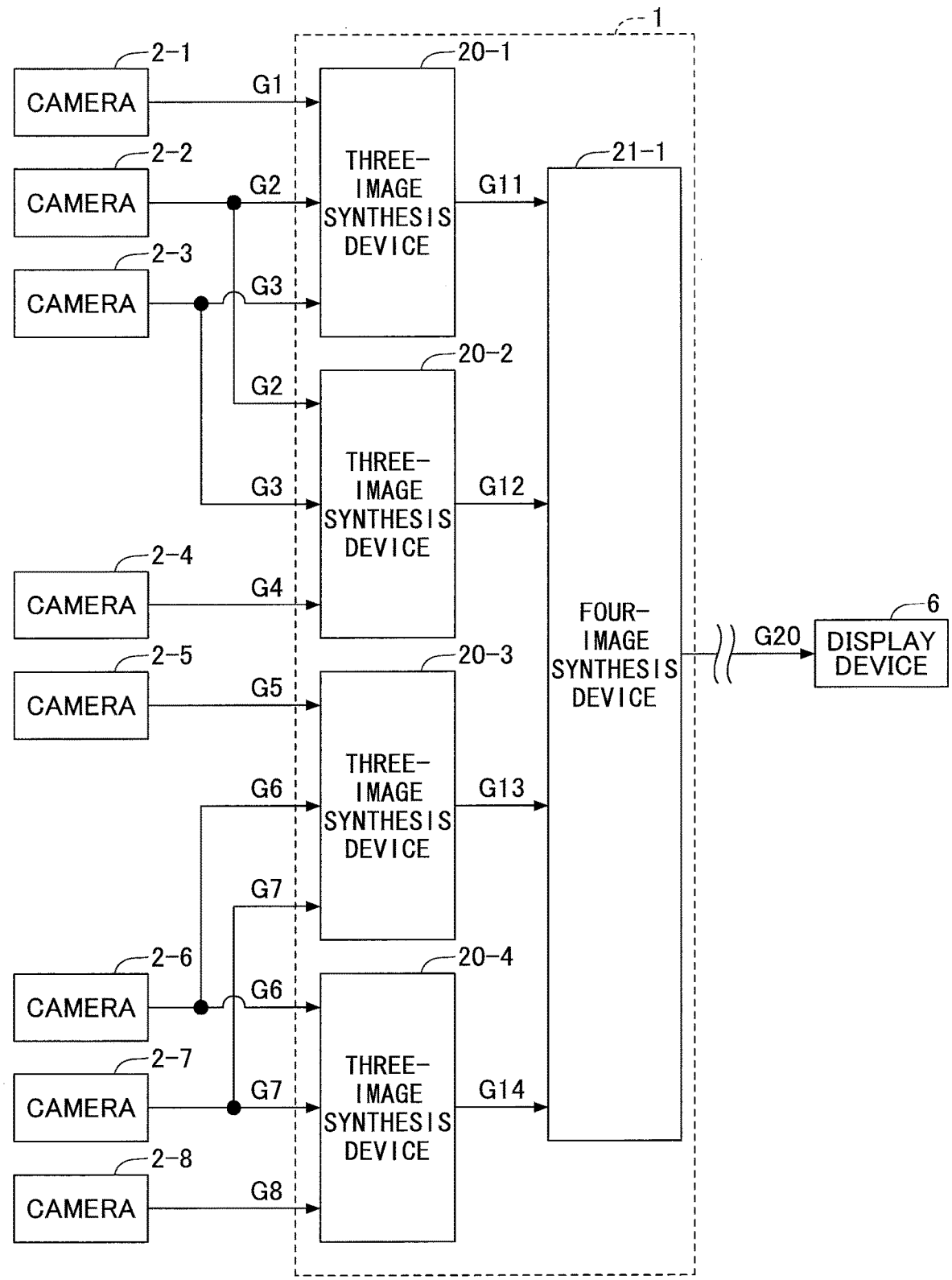
FIG. 12 is a block diagram illustrating a flow of a process to create an output image from input images of the eight cameras in FIG. 10 via sectional images.
Figure 13A:
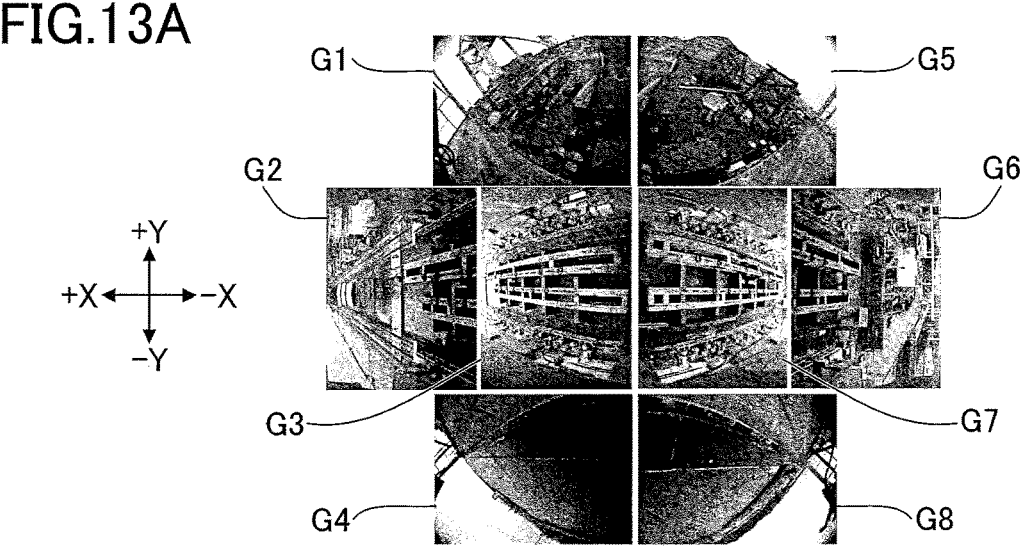
FIG. 13A snows photographic illustrations of input images in the process of FIG. 12.
Figure 13B:
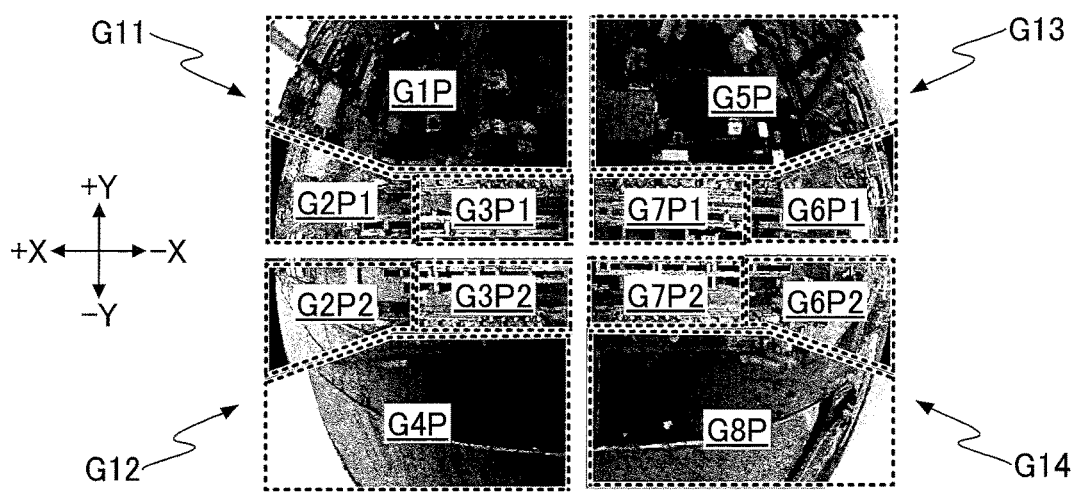
FIG. 13B shows photographic illustrations of sectional images in the process of FIG. 12.
Figure 13C:
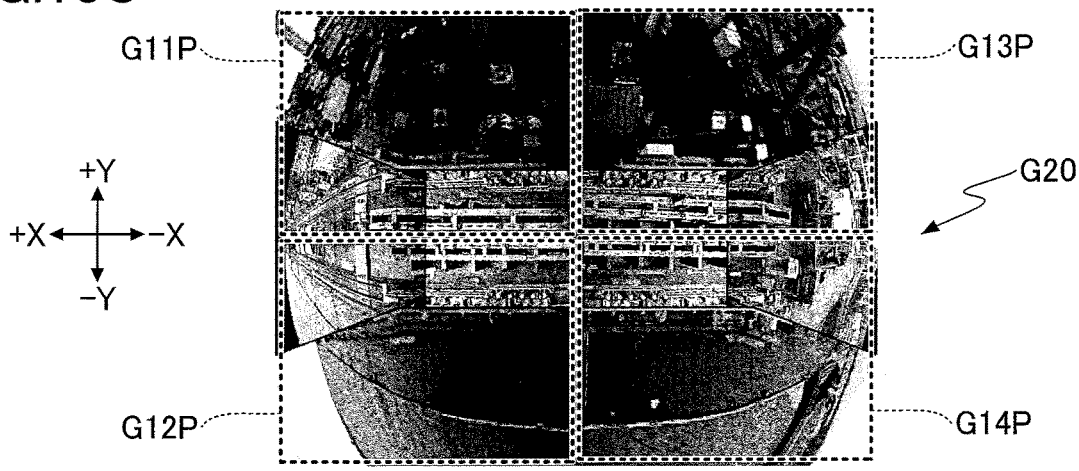
FIG. 13C shows a photographic illustration of an output image in the process of FIG. 12.
Figure 14:
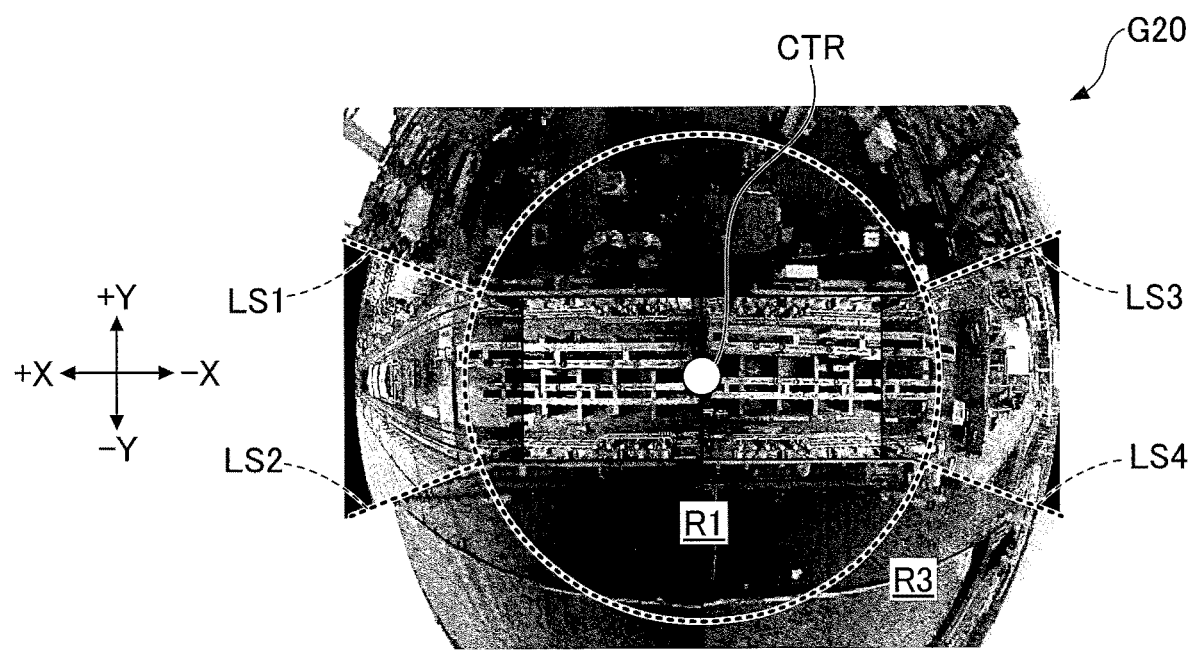
FIG. 14 is a photographic illustration illustrating features of a running body monitoring image.

Similarly, when the image creating device 100 changes a viewpoint of an output image, the image creating device 100 is capable of creating an output image (a viewpoint conversion image) viewed from a desired viewpoint by just rewriting the processing-target image/output image correspondence map 42 by changing values of various parameters of the virtual camera 2V, without rewriting the contents of the input image/space model correspondence map 40 and the space model/processing-target image correspondence map 41, Next, with reference to FIGS. 10A~14, a process will be described in which the image creating device 100 creates a running body monitoring image as an output image by using input images of eight cameras attached to the running body 61. FIGS. 10A~10C illustrate arrangement plan of the eight cameras with a top view, a side view, and a front view of the running body 61 of the jib crane 60. FIGS. 11A~11C are schematic diagrams of imaging ranges of the eight cameras with a top view, a side view, and a front view of the running body 61. FIG. 12 is a block diagram illustrating a flow of a process for creating one output image from eight input images through four sectional images. FIGS. 13A~13C are diagrams illustrating examples of the input images, the sectional images, and the output image in the process in FIG. 12. FIG. 14 is a diagram illustrating features of the running body monitoring image.

Figure 10B:
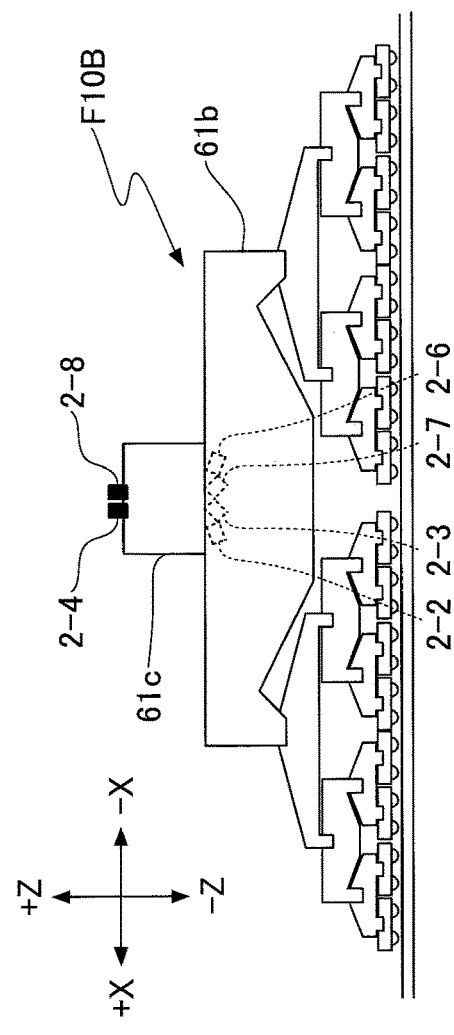
FIG. 10B is an arrangement plan (a side view) of eight cameras attached to a running body of the jib crane.

As shown in FIGS. 10A~10C, eight cameras 2-1~2-8 are attached to the running body 61 of the jib crane 60. Specifically, as shown in the top view F10A (FIG. 10A), the side view F10B (FIG. 10B), and the front view F10C (FIG. 10C) of the running body 61, two cameras 2-1 and 2-5 capturing an outer side (+Y side) of the leg part 61a, a camera 2-2 capturing one side (+X side) in a rail extending direction, two cameras 2-3 and 2-7 capturing a space between the pair of leg parts 61a and 61b, a camera 2-6 capturing the other side (−X side) in the rail extending direction, and two cameras 2-4 and 2-8 capturing an outer side (−Y side) of the leg part 61b are attached to the running body 61.

The camera 2-1 is attached to an upper end part at +Y side of the beam part 61c, and has an optical axis indicated by a dashed-two dotted chain line of the top view F11A (FIG. 11A) and the front view F11C (FIG. 11C). The optical axis intersects with a road surface at a point CP1. A region CR1 indicated by a coarse dot pattern of the top view F11A (FIG.

11A) and the front view F11C (FIG. 11C) represents a part of an imaging range of the camera 2-1. For clarity of the figure, FIGS. 11A~11C omits the cameras. The side view F11B (FIG. 11B) is a partial cross-section diagram when seeing a vertical plane indicated by a dotted line of the top view F11A (FIG. 11A) from a DB direction. The front view F11C (FIG. 11C) is a partial cross-section diagram when seeing a vertical plane indicated by a dotted line of the side view F11B (FIG. 11B) from a DC direction. For clarity of the figure, the side view F11B (FIG. 11B) omits a part of the leg parts 61a, 61b.

The camera 2-2 is attached to an undersurface of the beam part 61c, and has an optical axis indicated by a dashed line of the top view F11A (FIG. 11A) and the side view F11B (FIG. 11B). The optical axis intersects with the road surface at a point CP2. A region CR2 indicated by a diagonally left down slash pattern of the top view F11A (FIG. 11A) and the side view F11B (FIG. 11B) represents a part of an imaging range of the camera 2-2. A region CR1-2 of the top view F11A (FIG. 11A) represents an overlap region of the imaging range of the camera 2-1 and the imaging range of the camera 2-2. Also, the camera 2-2 may be attached to a top surface or a side surface of the beam part 61c.

The camera 2-3 is attached to the undersurface of the beam part 61c, and has an optical axis indicated by a dashed dotted line of the side view F11B (FIG. 11B). The optical axis intersects with the road surface at a point CP3. A region CR3 indicated by a diagonally right down slash pattern of the top view F11A (FIG. 11A), the side view F11B (FIG. 11B), and the front view F11C (FIG. 11C) represents a part of an imaging range of the camera 2-3. A region CR2-3 of the top view F11A (FIG. 11A) and the side view F11B (FIG. 11A) represents an overlap region of the imaging range of the camera 2-2 and the imaging range of the camera 2-3.

The camera 2-4 is attached to an upper end part at −Y side of the beam part 61c, and has an optical axis indicated by a dashed-two dotted line of the top view F11A (FIG. 11A) and the front view F11C (FIG. 11C). The optical axis intersects with, the road surface at a point CP4. A region CR4 indicated by a coarse dot pattern of the top view F11A (FIG. 11A) and the front view F11C (FIG. 11C) represents a part of an imaging range of the camera 2-4. A region CR2-4 of the top view F11A (FIG. 11A) represents an overlap region of the imaging range of the camera 2-2 and the imaging range of the camera 2-4.

The camera 2-5 is attached to an upper end part at +Y side of the beam part 61c, and has an optical axis indicated by a dashed-two dotted line of the top view F11A (FIG. 11A). The optical axis intersects with the road surface at a point CP5. A region CR5 indicated, by a fine clot pattern of the top view F11A (FIG. 11A) represents a part of an imaging range of the camera 2-5. A region CR1-5 of the top view F11A (FIG. 11A) represents an overlap region of the imaging range of the camera 2-1 and the imaging range of the camera 2-5.

The camera 2-6 is attached to the undersurface of the beam part 61c, and has an optical axis indicated by a dashed line of the top view F11A (FIG. 11A) and the side view F11B (FIG. 11B). The optical axis intersects with the road surface at a point CP6. A region CR6 indicated by a diagonally right down slash pattern of the top view F11A (FIG. 11A) and the side view F11B (FIG. 11B) represents a part of an imaging range of the camera 2-6. A region CR5-6 of the top view F11A (FIG. 11A) represents an overlap region of the imaging range of the camera 2-5 and the imaging range of the camera 2-6. Also, the camera. 2-6 may be attached to the top surface or the side surface of the beam part 61c.

The camera 2-7 is attached to the undersurface of the beam, part 61c, and has an optical axis indicated by a dashed dotted line of the side view F11B (FIG. 11B). The optical axis intersects with the road surface at a point CP7. A region CR7 indicated by a diagonally left down slash pattern of the top view F11A (FIG. 11A) and the side view F11B (FIG. 11B) represents a part of an imaging range of the camera 2-7. A region CR6-7 of the top view F11A (FIG. 11A) and the side view F11B (FIG. 11B) represents an overlap region of the imaging range of the camera 2-6 and the imaging range of the camera 2-7.

The camera 2-8 is attached to the top end part at −Y side of the beam part 61c, and has an optical axis Indicated by a dashed-two dotted line of the top view F11A (FIG. 11A). The optical axis intersects with the road surface at a point CP8. A region CR8 indicated by a fine dot pattern of the top view F11A (FIG. 11A) represents a part of an imaging range of the camera 2-8. A region CR6-8 of the top view F11A (FIG. 11A) represents an overlap region of the imaging range of the camera 2-6 and the imaging range of the camera 2-8. A region CR4-8 of the top view F11A (FIG. 11A) represents an overlap region of the imaging range of the camera 2-4 and the imaging range of the camera 2-8.

Eight cameras 2-1~2-8 arranged as described above output input images G1~G8 to the control device 1, respectively.

Next, with reference to FIGS. 12 and 13A~13C, a flow of a process will be described in which one output image is created from eight input images G1~G8 of eight cameras 2-1~2-8 through four sectional images.

In the present embodiment, the control device 1 has three-image synthesis devices 20-1~20-4 as a sectional image creating device for creating one of sectional images which forms a part of a final output image by using three input images, and a four-image synthesis device 21-1 as an output image creating device for creating one output image by using four sectional images.

FIG. 13A illustrates examples of the eight input images G1~G8 which each of the eight cameras 2-1~2-8 outputs. FIG. 13B illustrates examples of the four sectional images (intermediate images) G11~G14 which each of the four three-image synthesis devices 20-1~20-4 outputs. FIG. 13C illustrates an example of an output image G20 which the four-image synthesis device 21-1 outputs.

The three-image synthesis device 20-1 creates an intermediate image G11 based on an input image G1 from the camera 2-1, an input image G2 from the camera 2-2, and an input image G3 from the camera 2-3. Then, the three-image synthesis device 20-1 outputs the created intermediate image Gil to the four-image synthesis device 21-1.

Similarly, the three-image synthesis device 20-2 creates an intermediate image G12 based on the input image G2 from the camera 2-2, the input image G3 from, the camera 2-3, and an input image G4 from the camera 2-4. Also, the three-image synthesis device 20-3 creates an intermediate image G13 based on an input image G5 from the camera 2-5, an input image G6 from the camera 2-6, and. the input image G7 from the camera 2-7. Also, the three-image synthesis device 20-4 creates an intermediate image G14 based on the input image G6 from the camera 2-6, the input image G7 from the camera 2-7, and an input image G8 from the camera 2-8. Then, the three-image synthesis devices 20-2, 20-3, 20-4 output the created intermediate images G12, G13, G14 to the four-image synthesis device 21-1.

The four-image synthesis device 21-1 creates the output image G20 based on the sectional images (intermediate images) G11~G14 from the three-image synthesis devices 20-1~20-4. Then, the four-image synthesis device 21-1 outputs the created output image G20 to the display device 6 via the wireless communication devices 5a, 5b.

As a result, the intermediate image G11 of FIG. 13B includes an image part G1P with which a part of the input image G1 is associated, an image part G2P1 with which a part of the input image G2 is associated, and an image part G3P1 with which a part of the input image G3 is associated.

Also, the intermediate image G12 of FIG. 13B includes an image part G2P2 with which another part of the input image G2 is associated, an image part G3P2 with which another part of the input image G3 is associated, and an image part G4P with which a part of the input image G4 is associated.

Also, the intermediate image G13 of FIG. 13B includes an image part G5P with which a part of the input image G5 is associated, an image part G6P1 with which a part of the input image G6 is associated, and an image part G7P1 with which a part of the input image G7 is associated.

Also, the intermediate image G14 of FIG. 13B includes an image part G6P2 with which another part of the input image G6 is associated, an image part G7P2 with which another part of the input image G7 is associated, and an image part G8P with which a part of the input image G8 is associated.

Also, the output image G20 of FIG. 13C includes image parts G11P~G14P with which each of the intermediate images G11~G14 is associated.

Here, with reference to FIGS. 13A~13C and 14, details of the output image G20 created by the image creating device 100 will be described. FIG. 14 is an example of the output image G20. It corresponds to the output image G20 of FIG. 13C. A circle indicated by a dotted line in FIG. 14 represents a dividing line between the flat surface area R1 of the space model MD and the processing-target image plane R3 Four line segments LS1 ~LS4indicated by dotted lines in FIG. 14 represents a dividing line between an image part with which a part of an input image of a side camera (the camera 2-1, 2-4, 2-5, 2-8) capturing a scene at the side of the running body 61 is associated, and an image part with which a part of an input image of a far camera (the camera 2-2, 2-6) capturing a distant running lane along the rail RA is associated. A white circle in FIG. 14 represents a cylinder center CTR of the space model MD. It should be noted that the dotted lines and the white circle in FIG. 14 are not displayed on the actual output image G20.

As illustrated in FIGS. 13A~13C and 14, the image creating device 100 projects the input images of each of the eight cameras 2-1~2-8 onto the flat surface area R1 and the curved surface area R2 of the space model MD, and re-projects the image projected on the curved surface area R2 onto the processing-target image plane R3. Then, the image creating device 100 creates the output image G20 based on the image projected on the flat surface area R1 and the image re-projected on the processing-target image plane R3.

Specifically, the image creating device 100 divides the space model MD into four partial space models each of which has a quadrant bottom surface, and divides the processing-target image plane R3 into corresponding four partial processing-target image planes. Then, the image creating device 100 projects input images of three cameras onto a flat surface area and a curved surface area of one of the partial space models, and re-projects the image projected on the curved surface area onto a corresponding partial processing-target image plane (see FIG. 13B). Then, the image creating device 100 creates the output image G20 based on images projected on the four flat surface areas and images re-projected on the four partial processing-target image planes (see FIG. 13C). In this way, the image creating device 100 creates as the output image G20 a running body monitoring image which simultaneously displays an image showing a neighborhood of the running body 61 viewed from above (an image on the flat surface area R1) and an image showing surroundings in a horizontal direction viewed from the running body 61 (an image on the processing-target image plane R3).

Also, in the present embodiment, as shown in FIGS. 13A~13C and 14, the image creating device 100 locates a road surface image of the space between the pair of leg parts 61a, 61b (the image part G3P1, G3P2, G7P1, G7P2) and an image of a space at the side of the running body 61 (the image part G1P, G4P, G5P, G8P) immediately adjacent to each other. That is, the image creating device 100 creates the output image G20 as if the leg parts 61a, 61b of the running body 61 do not exist.

Also, in the present embodiment, as shown in FIG. 14, the image creating device 100 creates the output image G20 so that a length of the running body 61 along X-axis coincides with a diameter of a cylinder of the space model MD. Also, the image creating device 100 creates the output image G20 so that its cylindrical surface passes through both ends of the leg parts 61a, 61b (four ends in total which are two ends of the leg part 61a and two ends of the leg part 61b when viewed from the above).

Moreover, in the present embodiment, as shown in FIG. 14, the image creating device 100 sets as a dividing line between the image part G1P and the image part G2P1 a line segment LS1 which is a part of a straight line passing through the cylinder center CTR and the +X side end of the leg part 61a viewed from the above (see FIG. 13B). Similarly, the image creating device 100 sets as a dividing line between the image part G4P and the image part G2P2 a line segment LS2 which is a part of a straight line passing through the cylinder center CTR and the +X side end of the leg part 61b viewed, from the above (see FIG. 13B). Also, the image creating device 100 sets as a dividing line between the image part G5P and the image part G6P1 a line segment LS3 which is a part of a straight line passing through the cylinder center CTR and the −X side end of the leg part 61a viewed from the above (see FIG. 13B). Also, the image creating device 100 sets as a dividing line between the image part G8P and the image part G6P2 a line segment LS4 which is a part of a straight line passing through the cylinder center CTR and the −X side end of the leg part 61b viewed from the above (see FIG. 13B). The cylinder center CTR is a mounting position of the cameras 2-2, 2-3, 2-6, and 2-7. Due to this image arrangement, the image creating device 100 can display horizontal images showing the ends of the leg parts 61a, 61b viewed from the cylinder center CTR in the image parts G2P1, G2P2, G6P1, and G6P2 (see FIG. 13B), and can show outside in its extending direction of the ends of the leg parts 61a, 61b to an operator.

By the above configuration, the jib crane 60, on which the image creating device 100 is mounted, can prompt an operator of the jib crane 60 to confirm the safety. As a result, jib crane 60 can prevent the running body 61 from colliding with a surrounding obstacle (a person, a vehicle, etc.) when the operator runs the running body 61. Also, the jib crane 60 can prevent the running body 61 from colliding with a surrounding obstacle (a person, a vehicle, etc.) within a space between the pair of leg parts 61a, 61b when the operator runs the running body 61 by showing an appearance of the space to the operator. Also, the jib crane 60 can prevent the running body 61 from colliding with a surrounding obstacle (a person, a vehicle, etc.) in a space outside of each of the pair of leg parts 61*a*, 61*b* when the operator runs the running body 61 by showing an appearance of the space to the operator.

Also, the image creating device 100 separately provides a far camera for capturing a distant running lane along the rail RA and a near camera for capturing a road surface of a near running lane located between the pair of leg parts 61*a*, 61*b*. Specifically, the image creating device 100 is provided with the camera 2-2 and 2-6 as the distant cameras, and is provided with the camera 2-3 and 2-7 as the near cameras. Thus, even if an image capturing condition (for example, a peripheral brightness) of a distant running lane is different from an image capturing condition of a near running lane, the image creating device 100 can make effective use of an automatic gain control function, an day-night function, or the like of individual cameras. That is, the image creating device 100 can prevent an adaptation to one image capturing condition from being sacrificed for an adaptation to the other image capturing condition. For example, in a case where a brightness of the space between the pair of leg parts 61*a*, 61*b* is different from a brightness of the space outside of the pair of leg parts 61*a*, 61*b*, if the two spaces with different brightness are captured by one camera, an image part corresponding to either one of the two spaces become overexposed or underexposed. However, if the two spaces with different brightness are captured by separate cameras, image parts corresponding to each of the two spaces can be captured with correct exposure.

Also, in the present embodiment, as shown in the side view F11B (FIG. 11B), four cameras 2-2, 2-3, 2-6, and 2-7 are arranged so that, at a road surface level, a distance D2-3 between the intersection CP2 and the intersection CP3, a distance D6-7 between the intersection CP6 and the intersection CP7, and a distance D3-7 between the intersection CP3 and the intersection CP7 divide a length of the running body 61 in X-axis direction equally among three. This is because, when the number of pixels in an input image is constant, resolution of the image parts G2P1, G2P2 decrease with increase in the distance D2-3, resolution of the image parts G3P1, G3P2, G7P1, G7P2 decrease with increase in the distance D3-7, and resolution of the image parts G6P1, G6P2 decrease with increase in the distance D6-7. The intersection CP2 is an intersection of the optical axis of the camera 2-2 and the road surface, the intersection CP3 is an intersection of the optical axis of the camera 2-3 and the road surface, the intersection CP6 is an intersection of the optical axis of the camera 2-6 and the road surface, and the intersection CP7 is an intersection of the optical axis of the camera 2-7 and the road surface. Due to this camera, configuration, the image creating device 100 can increase the resolutions of the image parts G2P1, G2P2, G3P1, G3P2, G6P1, G6P2, G7P1, and G7P2, and can make efficient use of input images of respective cameras.

Also, in the present embodiment, as shown in the front view F11C (FIG. 11C), the imaging range CR3 of the camera 2-3 indicated by the diagonally right down slash pattern is set to include lower areas of two inner walls 61*a*1, 61*b*1, which face each other, of the pair of leg parts 61*a*, 61*b*, Specifically, the imaging range CR3 of the camera 2-3 is set to abut both the imaging range CR1 of the camera 2-1 and the imaging range CR4 of the camera. 2-4 at the road surface level if it were not for the leg parts 61*a*, 61*b*, for example. In this case, a height H1 of the lower areas is, for example, two meters. Due to this camera configuration, the image creating device 100 can reliably capture a head of a person existing along the inner wall 61*a*1, 61*b*1 into an input image, and can prevent a situation where it captures only a foot of the person from arising. As a result, the image creating device 100 can display a fop view of an object (especially a person) existing along the inner wall 61*a*1, 61*b*1 on an output image, and can restrain or prevent the object from disappearing from the output image.

Also, in the above embodiment, the image creating device 100 creates four sectional images by using the four three-image synthesis devices, and then, synthesizes the four sectional images by using the four-image synthesis device to create an output image. In this way, the image creating device 100 can flexibly deal with a change in the number of cameras by using a plurality of image synthesis devices having the same configuration. Also, the image creating device 100 can lower the overall cost of the image creating device 100 required to create one output image from a plurality of input images by using a plurality of image synthesis devices having the same configuration. Also, the image creating device 100 makes it possible to realize speed up of a creation of an output image or a real time creation of an output image more easily by causing the plurality of image synthesis devices to synthesize images individually. However, the present invention is not limited to this configuration. For example, the image creating device 100 may create one output image directly from the eight input images without creating a sectional image. Alternatively, the image creating device 100 may use an image synthesis device which creates one output image by using two input images or more than three input images, or may use an image synthesis device which creates one output image by using two, three, or more than four sectional images. Also, the image creating device 100 may concurrently use two or more types of the image synthesis devices which are different in the number of input images to receive in creating a sectional image, such as a combination of a three-image synthesis device, a four-image synthesis device, and five-image synthesis device.

Also, the image creating device 100 creates the running body monitoring image G20 from the eight input images G1~G8 of each of the eight running body cameras (the camera 2-1~2-8) attached to the running body 61. However, the present invention is not limited to this configuration. For example, the image creating device 100 may omit one or more cameras out of the eight cameras 2-1 ~2-8. For example, the image creating device 100 may omit the far camera (the cameras 2-2, 2-6), or may omit the near camera (the cameras 2-3, 2-7), or may omit a side camera (the cameras 2-1, 2-4, 2-5, 2-8).

Next, with reference to FIGS. 15A and 15B, a process in which the control device 1 adjusts an output image will be described. FIGS. 15A and 15B are diagrams illustrating a relationship between an output image and a re-projection angle. FIG. 15A includes an output image G20B before an adjustment by the image adjusting part 12. FIG. 15B includes an output image G20 after an adjustment by the image adjusting part 12. Figures below the output images G20B, G20 are schematic diagrams illustrating a relationship between the space model MD and re-projection lines RL1, RL2 relating to the cameras 2-1, 2-2. Also, for clarity of the figure, re-projection lines or the like relating to other cameras are not shown.

In FIGS. 15A and 15B, a coordinate PT1, which is located on the line segment LS1 as the dividing line between the image part G1P and the image part G2P1, represents an intersection of the line segment LS1 and a curved line HL1 (dotted line) corresponding to an infinity line (a horizon, a sea horizon) on the image part G1P. A coordinate PT2 located on the line segment LS1 represents an intersection of the line segment LS1 and a curved line HL2 (dashed dotted line) corresponding to an infinity line on the image part G2P1. The curved lines HL1, HL2 represent positions of infinity lines which are visible if it were not for an obstacle regardless of whether the infinity lines are actually visible or not. Also, the curved lines HL1, HL2 are arc-like curved lines because they correspond to infinity lines on the image parts G1P, G2P1 of a processing-target image created by using the space model MD having a cylindrical shape. However, a line corresponding to an infinity line is not always a curved line. For example, if a processing-target image is created by using a space model having a cuboid shape, a line corresponding to an infinity line is a straight line. The line segment LS1, the coordinates PT1, PT2, the curved lines HL1, HL2, the cylinder center CTR, and the camera 2-1, 2-2 are diagrammatic drawings for illustrative purposes, and are not actually displayed on the output images G20B, G20.

As shown in FIG. 15A, before the adjustment by the image adjusting part 12, that is, under a condition where a re-projection angle γ of the re-projection line RL1 relating to the camera 2-1 is identical to a re-projection angle γ of the re-projection line PL2 relating to the camera 2-2, the curved line HL1 and the curved line HL2 are discontinuous. This is due to the fact that an installation height HT1 of the camera 2-1 is different from an installation height HT2 of the camera 2-2.

Specifically, the re-projection lines RL1, RL2 constitute parallel lines forming an angle γ to the cylinder center (re-projection axis) CTR. Then, the re-projection lines RL1, RL2 intersect with the curved surface area R2 of the space model MD at the coordinates PP1, PP2, and intersect with the processing-target image plane R3 at the coordinates PT1, PT2. A height of the coordinate PP1 corresponds to a height of a point where a straight line, which passes through a coordinate of the camera 2-1 and an infinity point viewed from the camera 2-1, intersects with the curved surface area R2 of the space model MD. Similarly, a height of the coordinate PP2 corresponds to a height of a point where a straight line, which passes through a coordinate of the camera 2-2 and an infinity point viewed from the camera 2-2, intersects with the curved surface area R2 of the space model MD. That is, heights of the coordinates PP1, PP2 correspond to positions of the infinity lines viewed from, the cameras 2-1, 2-2, and correspond to the heights HT1, HT2 of the cameras 2-1, 2-2.

In other words, the re-projection line RL1 is a straight line joining the coordinate PP1 on the curved surface area R2 of the space model MD and the coordinate PT1 on the processing-target image plane corresponding to the coordinate PP1. The coordinate PP1 corresponds to a coordinate on a line corresponding to an infinity line on the input image plane of the camera 2-1. Also, the re-projection line RL2 is a straight line joining the coordinate PP2 on the curved surface area R2 of the space model MD and the coordinate PT2 on the processing-target image plane corresponding to the coordinate PP2. The coordinate PP2 corresponds to a coordinate on a line corresponding to an infinity line on the input image plane of the camera 2-2.

Then, the re-projection angles γ relating to each camera (each input image) are the same angle. Thus, a distance between the coordinate PT1 and the re-projection axis CTR is greater than a distance between the coordinate PT2 and the re-projection axis CTR. That is, the coordinate PT1 and the coordinate PT2 do not coincide with each other. As a result, the curved line HL1 and the curved line HL2 are discontinuous.

On the other hand, as shown in FIG. 15B, after the adjustment by the image adjusting part 12, that is, under a condition where a re-projection angle γ1 of the re-projection line RL1 relating to the camera 2-1 and a re-projection angle γ2 of the re-projection line RL2 relating to the camera 2-2 are determined individually, the curved line HL1 and the curved line HL2 can be continuous.

In the present embodiment, the image adjusting part 12 determines the re-projection angles γ1, γ2 individually so that a distance between the coordinate PT1 and the re-projection axis CTR becomes equal to a distance between the coordinate PT2 and the re-projection axis CTR, that is, the coordinate PT1 and the coordinate PT2 coincide with each other.

Specifically, the image adjusting part 12 acquires a desired infinity line position (for example, a distance between the curved lines HL1, HL2 and the re-projection axis CTR) which an operator inputs by using an input device (not shown). Then, the image adjusting part 12 determines the coordinates PT1, PT2 based on the acquired infinity line position. Then, the image adjusting part 12 derives as the re-projection angle γ1 an angle formed between the re-projection axis CTR and the re-projection line RL1 which is a straight line passing through the coordinate PP1 and the newly determined coordinate PT1. Similarly, the image adjusting part 12 derives as the re-projection angle γ2 an angle formed between the re-projection axis CTR and the re-projection line RL2 which is a straight line passing through the coordinate PP2 and the newly determined coordinate PT2.

In this way, the image adjusting part 12 determines a re-projection angle for each camera (for each input image) in response to an input operation of an operator so that the curved line HL1 and the curved line HL2 become continuous at a desired infinity line position. That is, positions corresponding to infinity lines on each of a plurality of image parts become continuous.

Figure 16:
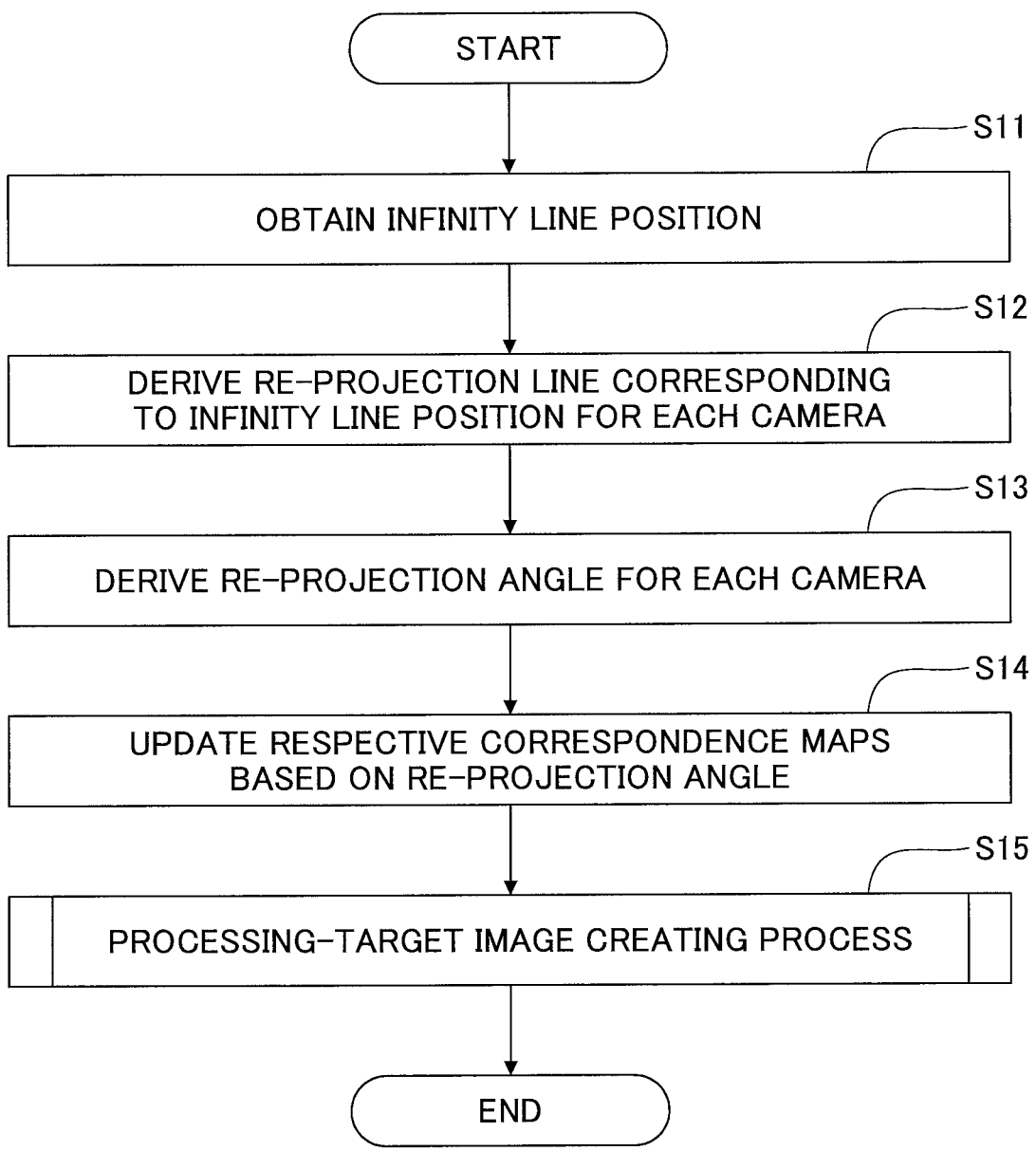
FIG. 16 is a flowchart illustrating a flow of an output image adjusting process.

Next, with reference to FIG. 16, a flow of a process in which the control device 1 adjusts an output image (herein after referred to as "output image adjusting process") will be described. FIG. 16 is a flowchart illustrating a flow of the output image adjusting process. For example, the control device 1 performs the output image adjusting process in response to an input operation of an operator.

First, the image adjusting part 12 in the control device 1 acquires an infinity line position (step S11). In the present embodiment, the operator touch inputs through using a touch panel a position where a portion corresponding to an infinity line is to be displayed while viewing the output image G20B (see FIG. 15A). The image adjusting part 12 determines from, the touch inputted coordinate a coordinate PT1 on an image part in a processing-target image relating to an input image of the camera 2-1, and determines a coordinate PT2 on an image part in a processing-target image relating to an input image of the camera 2-2.

Specifically, the image adjusting part 12 determines the coordinates PT1, PT2 so that a distance between the touch inputted coordinate and the re-projection axis CTR may become equal to a distance between the coordinate PT1 and the re-projection axis CTR and may become equal to a distance between the coordinate PT2 and the re-projection axis CTR.

Then, the image adjusting part 12 derives for each camera (each input image) a re-projection line corresponding to the infinity line position (step S12). In the present embodiment, the image adjusting part 12 derives as the re-projection line RL1 relating to the camera 2-1 a straight line passing through the coordinate PT1 and the coordinate PP1. Also, the image adjusting part 12 derives as the re-projection line RL2 relating to the camera 2-2 a straight line passing through the coordinate PT2 and the coordinate PP2. Also, the image adjusting part 12 derives re-projection lines relating to other cameras (including at least a camera which outputs an input image constituting a horizontal image part in the output image G20) in a similar way.

Then, the image adjusting part 12 derives for each camera (each input image) a re-projection angle (step S13). In the present embodiment, the image adjusting part 12 derives as a re-projection angle γ1 an angle formed between the re-projection line RL1 and the re-projection axis CTR. Also, the image adjusting part 12 derives as a re-projection angle γ2 an angle formed, between the re-projection line RL2 and the re-projection axis CTR. The same goes for re-projection angles relating to other cameras.

Then, the coordinates-associating part 10 in the control device 1 updates respective correspondence maps in. the storage device 4 based on the re-projection angles relating to each camera (each input image) determined by the image adjusting part 12 (step S14).

Then, the image creating part 11 in the control device 1 creates a processing-target image based on the respective correspondence maps updated by the coordinates-associating part 11 (step S15). In the present embodiment, the image creating part 11 performs the processing-target image creating process in FIG. 9.

Figure 17:
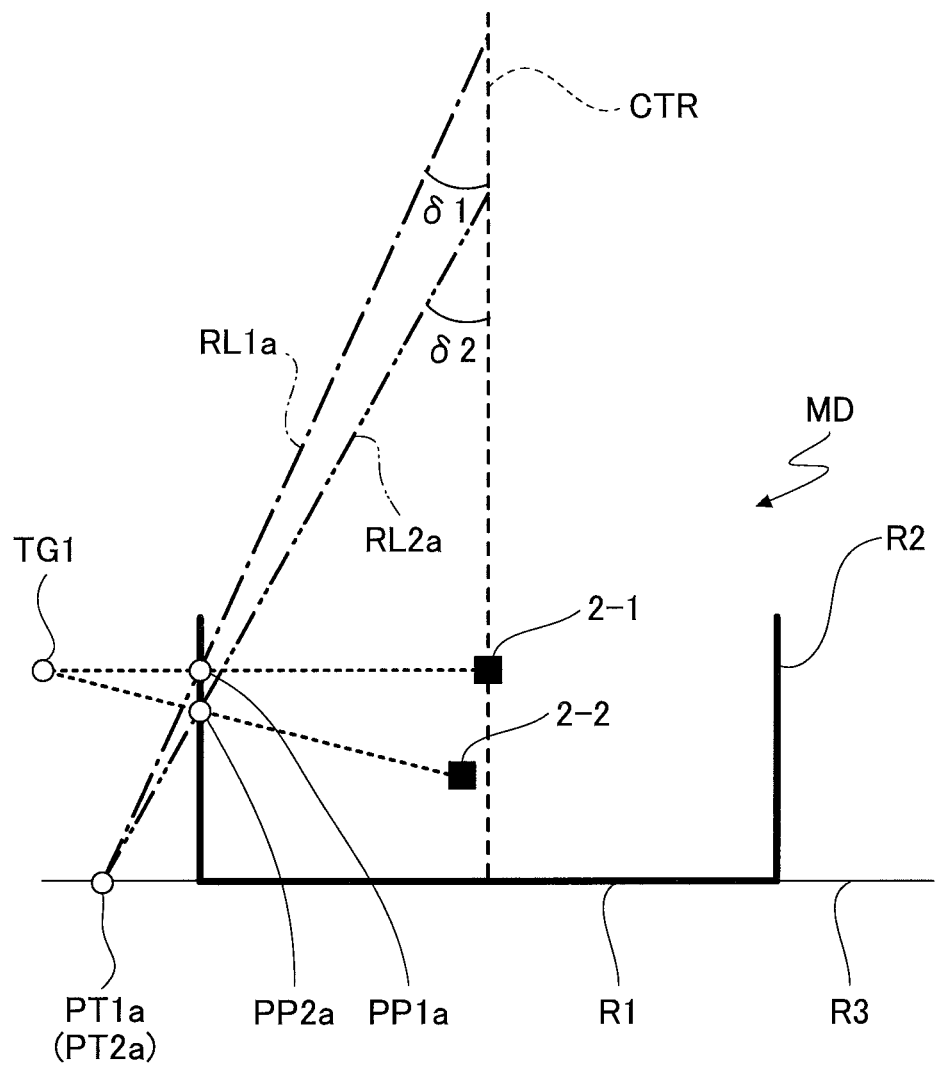
FIG. 17 is a schematic diagram illustrating a relationship between a space model and a re-projection line.

Next, with reference to FIG. 17, another example of the output image adjusting process will be described. FIG. 17 is a schematic diagram illustrating a relationship between the space model MD and the re-projection lines RL1, RL2 relating to the cameras 2-1, 2-2, and corresponds to a part of FIG. 15B. The example in FIG. 17 is different from the example in FIG. 15B in that it uses a position of a predetermined feature around the running body 61 instead of the infinity line position.

Specifically, FIG. 17 is a schematic diagram of a case where it determines re-projection angles of each camera (each input image) so that, in each of a plurality of image parts, image portions, which represent white lines horizontally drawn on a wall surface around the running body 61, become continuous. Also, a distance between the wall surface and the re-projection axis CTR is known and fixed.

In this case, the operator touch inputs through using a touch panel a position where an image portion representing the white line is to be displayed while viewing an output image. From the touch inputted coordinate, the image adjusting part 12 determines a coordinate PT1a on the image portion in the processing-target image relating to the input image of the camera 2-1, and determines a coordinate PT2a on the image portion in the processing-target image relating to the input image of the camera 2-2.

Specifically, the image adjusting part 12 determines the coordinates PT1a, PT2a so that a distance between the touch inputted coordinate and the re-projection axis CTR becomes equal to a distance between the coordinate PT1a and the re-projection axis CTR, and becomes equal to a distance between the coordinate PT2a and the re-projection axis CTR.

Then, the image adjusting part 12 derives as the re-projection line RL1a relating to the camera 2-1 a straight line passing through the coordinate PT1a and the coordinate PP1a. Also, the image adjusting part 12 derives as the re-projection line RL2a relating to the camera 2-2 a straight line passing through the coordinate PT2a and the coordinate PP2a. Also, the image adjusting part 12 derives re-projection lines relating to other cameras in a similar way.

A height of the coordinate PP1a corresponds to a height of a point where a straight line, which passes through a coordinate of the camera 2-1 and a coordinate TG1 of the white line, intersects with the curved surface area R2 of the space model MD. Also, a height of the coordinate PP2a corresponds to a height of a point where a straight line, which passes through a coordinate of the camera 2-2 and a coordinate TG1 of the white line, intersects with the curved surface area R2 of the space model MD. In this way, the example of FIG. 17 is different from the example of FIG. 15B in which the heights of coordinates PP1, PP2 correspond to the heights HT1, HT2 of the cameras 2-1, 2-2.

Then, the image adjusting part 12 derives as a re-projection angle δ1 an angle formed between the re-projection line RL1 a and the re-projection axis CTR. Also, the image adjusting part 12 derives as a re-projection angle δ2 an angle formed between the re-projection line RL2a and the re-projection axis CTR. The same goes for re-projection angles relating to other cameras.

Then, the coordinates-associating part 10 updates respective correspondence maps in the storage device 4 based on the re-projection angles relating to each camera (each input image) determined by the image adjusting part 12. Then, the image creating part 11 creates a processing-target image based on the respective correspondence maps updated by the coordinates-associating part 10.

By the above configuration, the image creating device 100 allows the operator to intuitively adjust a re-projection angle for each camera (each input image). Thus, the image creating device 100 allows positions, which correspond to infinity lines on a plurality of image parts in an output image corresponding to each of a plurality of cameras (a plurality of input images) with different installation heights, to become continuous. As a result, the image creating device 100 can unify, for example, an appearance of the sky in a plurality of image parts, and can improve an appearance of an output image.

Also, the image creating device 100 can adjust re-projection angles of a plurality of cameras at a time in response to one operation input by the operator. Thus, even if a plurality of cameras shares common heights, that is, even if positions corresponding to infinity lines on a plurality of image parts in an output image are already continuous, the image creating device 100 can easily move the positions corresponding to the infinity lines while keeping its continuity.

Also, the image creating device 100 can cause the positions corresponding to the infinity lines on the plurality of image parts in the output image to be continuous or to move, by causing the operator to input an infinity line position. Also, the image creating device 100 can cause the positions corresponding to the infinity lines on the plurality of image parts in the output image to be continuous or to move, by causing the operator to input not an indirect value of a re-projection angle but a direct value of an infinity line position. As a result, the image creating device 100 can improve an operability relating to an adjustment of a position corresponding to an infinity line.

Also, the image creating device 100 can cause positions corresponding to a predetermined feature on a plurality of image parts in an output image to be continuous or to move, by causing an operator to input a position where the predetermined feature in the vicinity of the running body 61 are to be displayed. Also, the image creating device 100 can cause the positions corresponding to the predetermined feature on the plurality of image parts in the output image to be continuous or to move, by causing the operator to input not an indirect value of a re-projection angle but a direct value of a position where the predetermined feature is to be displayed. As a result, the image creating device 100 can improve an operability relating to an adjustment of a position corresponding to a predetermined feature in the vicinity of the running body 61.

Also, the image creating device 100 allows an operator to adjust dimensions (for example, a radius of a cylinder) of the space model MD. In this case, the image creating device 100 maintains a continuity of an infinity line or a predetermined feature in the vicinity of the running body 61 on a plurality of image parts in an output image by updating re-projection angles relating to each camera (each input image), for example, when a radius of a cylinder of the space model MD has been changed. As a result, the image creating device 100 can change allocation rates of a horizontal image area and a road surface image area while keeping the continuity of the infinity line or the predetermined feature in the vicinity of the running body 61 on the plurality of image parts in the output image.

Next, with reference to FIGS. 18A through 21B, a case where an image creating device 100A has been applied to a shovel 70 will be described. A configuration of the image creating device 100A mounted on the shovel 70 is the same as the configuration of the image creating device 100 mounted on the jib crane 60, except for a camera configuration. Thus, an explanation of common portions is omitted, and the camera configuration as a point of difference will be described.

Figure 18B:
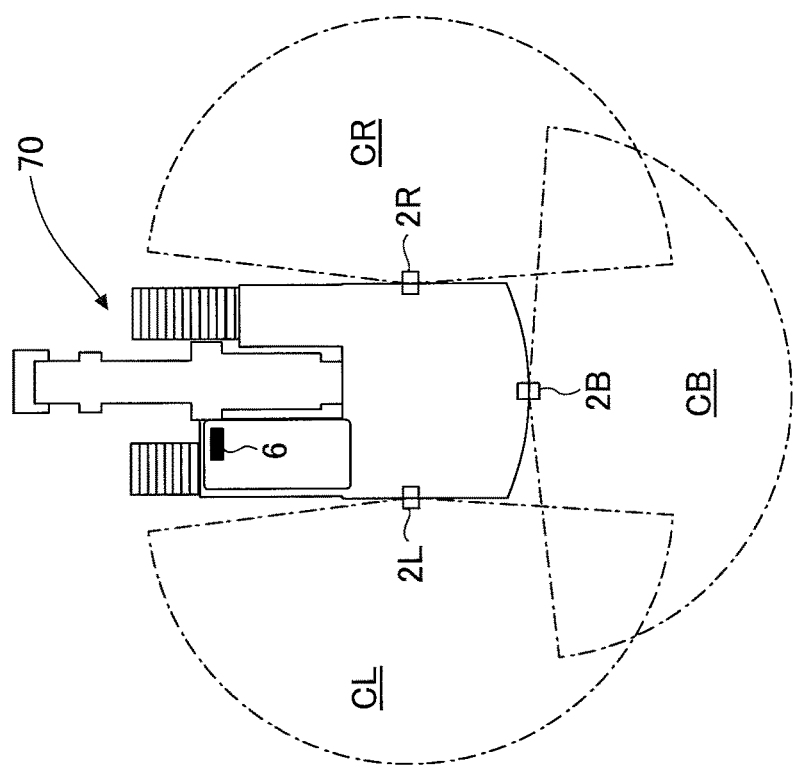
FIG. 18B is a top view of the configuration example of the shovel in FIG. 18A.
Figure 18A:
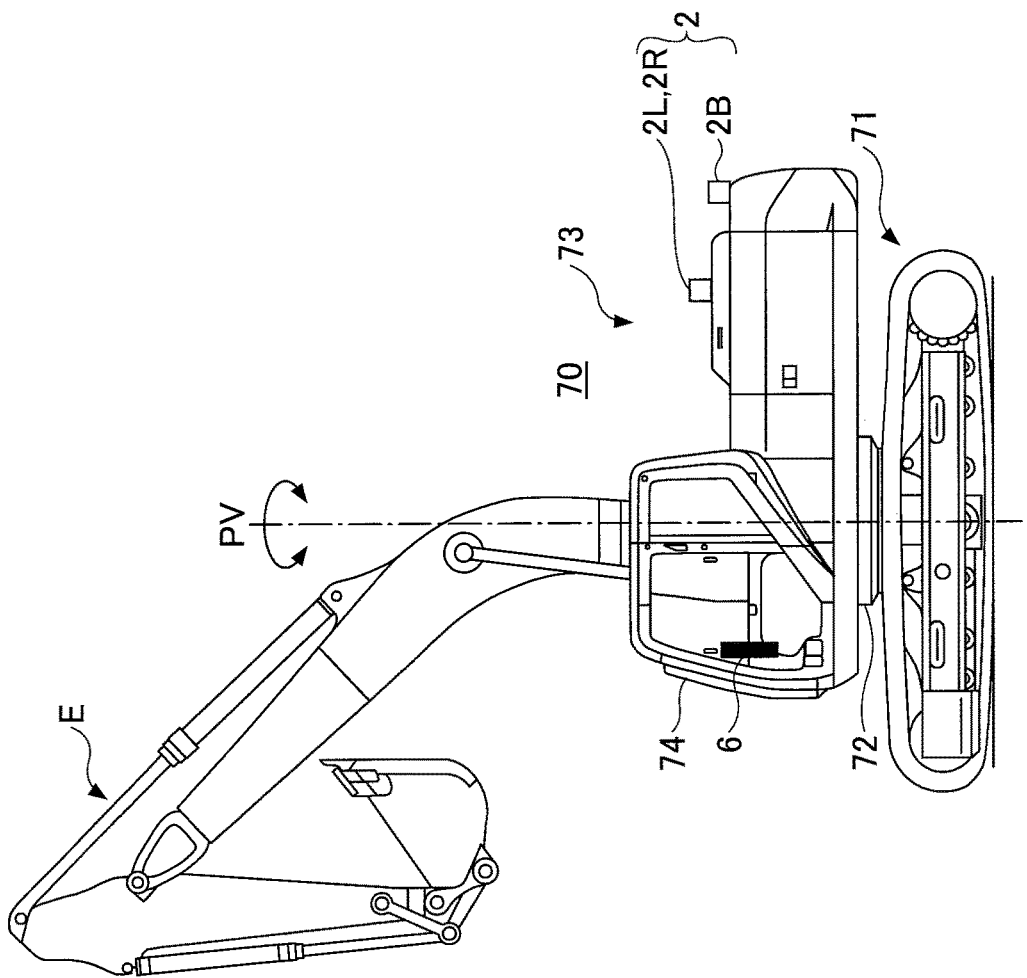
FIG. 18A is a side view of a configuration example of a shovel to which an image creating device according to an embodiment of the present invention is mounted.

FIGS. 18A and 18B are diagrams illustrating a configuration example of the shovel 70 on which the image creating device 100A is mounted. FIG. 18A illustrates its side view, and FIG. 18B illustrates its top view.

The shovel 70 mounts an upper turning body 73 on a crawler-type lower running body 71 via a turning mechanism. 72. The upper turning body 73 is mounted so as to be turnable around a turning axis PV.

Also, the upper turning body 73 is provided with a cab (an operation room) 74 at its front-left part, an excavation attachment E at its front-center part, and cameras 2 (a left camera 2L, a right camera 2R, and a back camera 2B) on its left surface, on its right surface, and on its back surface. Areas CL, CR, CB indicated by dashed dotted lines in FIG. 18B represent imaging ranges of the left camera 2L, the right camera 2R, and the back camera 2B, respectively. In the present embodiment, an installation height of the left camera 2L is identical to an installation height of the right camera 2R, and higher than an installation height of the back camera 2B. The display device 6 is installed at a position where an operator in the cab 74 can easily view. In the present embodiment, the display device 6 is connected to the control device 1 without passing through a wireless communication device.

Figure 19A:
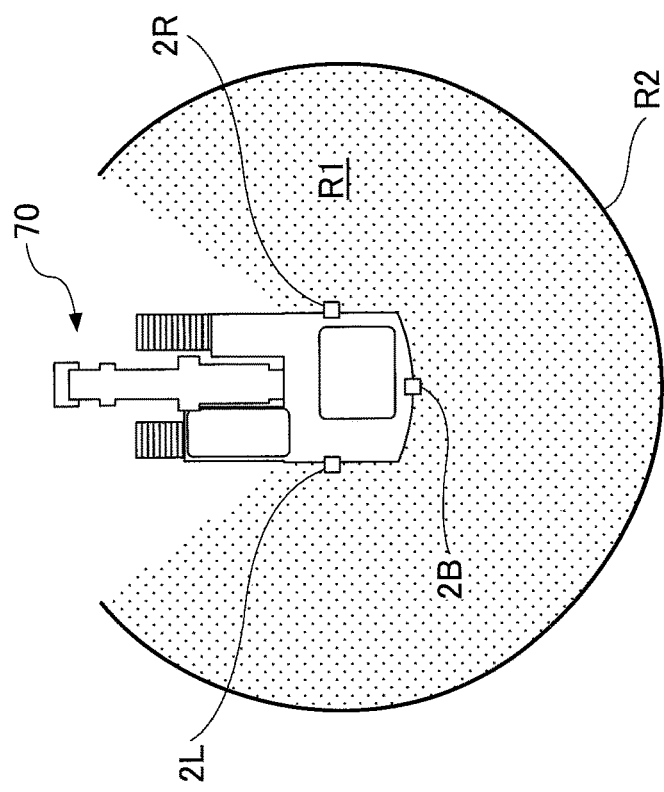
FIG. 19A is a perspective view illustrating another example of a space model to which an input image is projected.
Figure 19B:
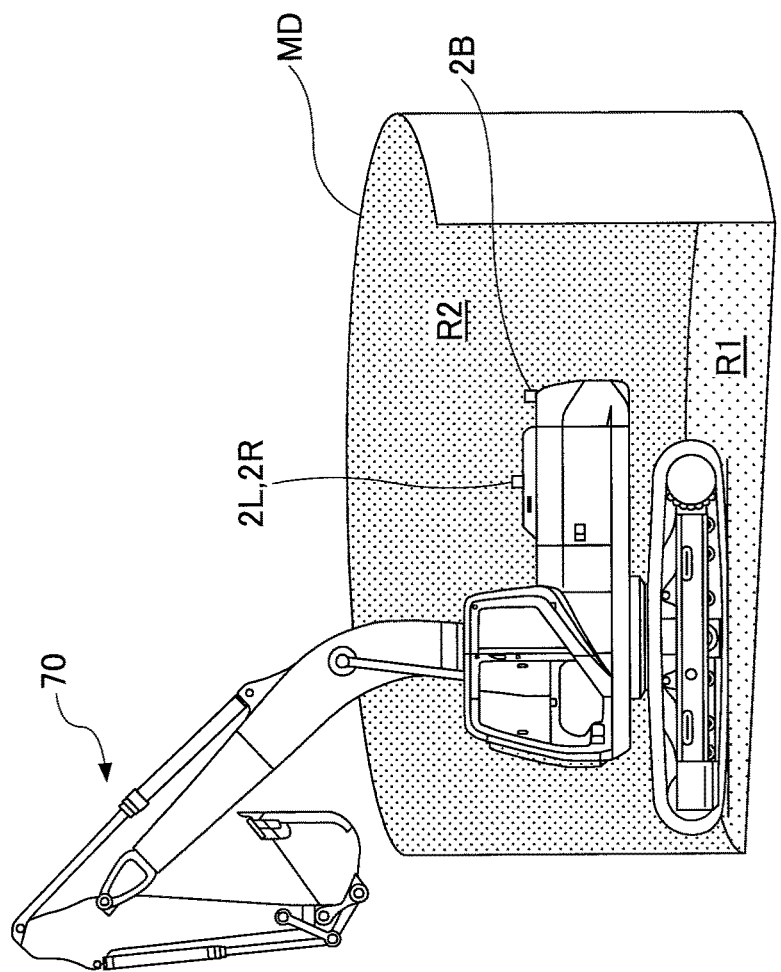
FIG. 19B is a top view of the space model in FIG. 19A.

FIGS. 19A and 19B are diagrams illustrating an example of a space model MD onto which an input image is projected. FIG. 19A illustrates a relationship between the shovel 70 and the space model MD when viewing the shovel 70 from the side. FIG. 19B illustrates a relationship between the shovel 70 and the space model MD when viewing the shovel 70 from the above.

As shown in FIGS. 19A and 19B, similar to the case of the jib crane 60, the space model MD has a cylindrical shape, and has a flat surface area R1 inside of its bottom surface and a curved surface area R2 inside of its side surface. Similar to the space model MD in the case of the jib crane 60, a processing-target image plane R3 (not shown) may be a circular area including the flat surface area R1 of the space model MD, or may be an annular area not including the flat surface area R1 of the space model MD.

FIGS. 20A~20D are diagrams illustrating input images of each of three cameras (the left camera 2L, the right camera 2R, and the back camera 2B) mounted on the shovel 70, and an output image created from the input images.

The image creating device 100A creates a processing-target image by projecting coordinates on input image planes of each or the three cameras 2 onto coordinates on the flat surface area R1 and the curved surface area R2 of the space model MD, and then by re-projecting onto the processing-target image plane R3. Then, the image creating device 100A creates an output image by applying an image conversion process (for example, a scale conversion process, an affine conversion process, a distortion conversion process, a viewpoint conversion process, etc.) to the created processing-target image. Then, the image creating device 100A displays an image showing a neighborhood of the shovel 70 viewed from above (an image on the flat surface area R1) and an image showing surroundings in a horizontal direction viewed from the shovel 70 (an image on the processing-target image plane R3).

Figure 21A:
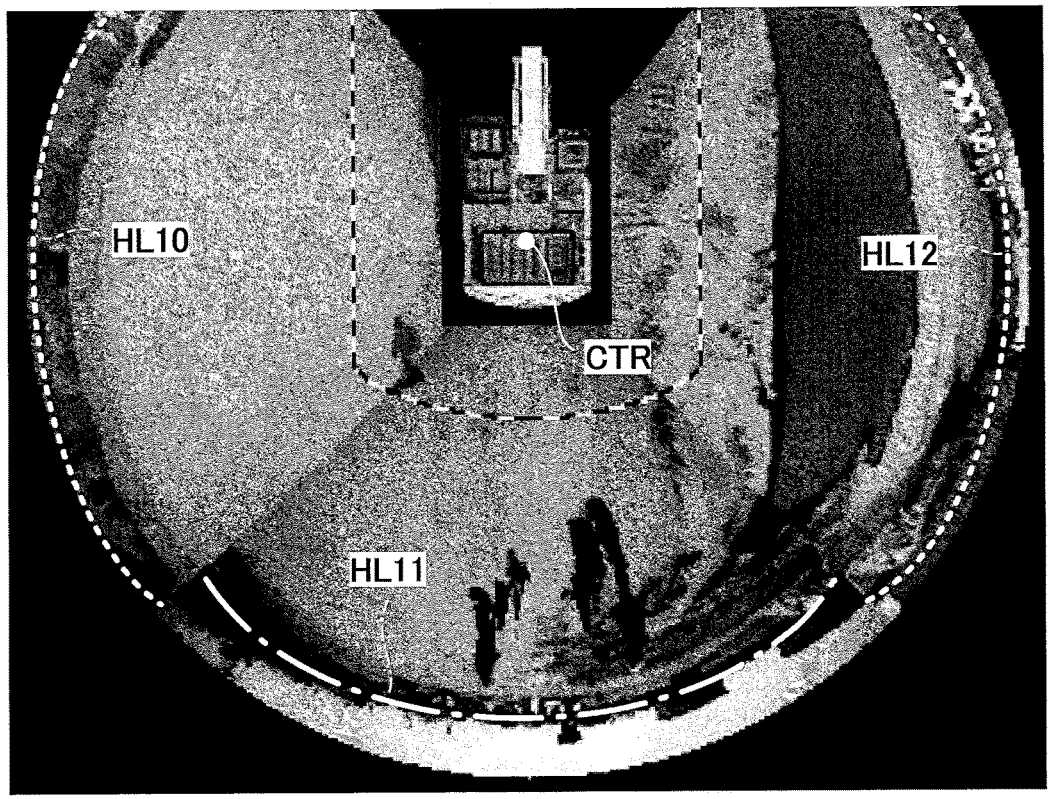
FIG. 21A is a photographic illustration of an output image before an adjustment by the image adjusting part.
Figure 21B:
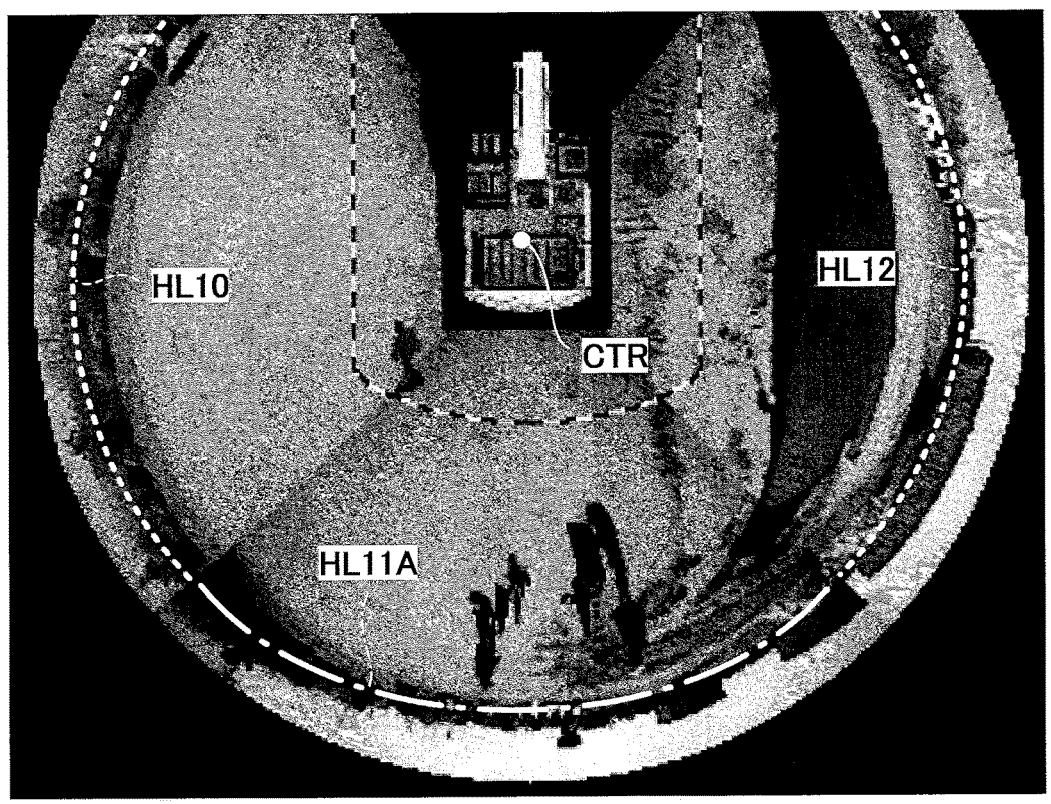
FIG. 21B is a photographic illustration of an output image after an adjustment by the image adjusting part.

FIGS. 21A and 21B are diagrams illustrating a relationship between an output image and a re-projection angle. Specifically, FIG. 21A illustrates an output image before an adjustment by the image adjusting part 12, and corresponds to the output image G20B in FIG. 15A. FIG. 21B illustrates an output image after an adjustment by the image adjusting part 12, and corresponds to the output image G20 in FIG. 15B.

In FIG. 21A, a curved line HL10 (dotted line) corresponds to an infinity line on a left image (an image portion based on an input image of the left camera 2L) of the output image. A curved line HL11 (dashed dotted line) corresponds to an infinity line on a back image (an image portion based on an input image of the back camera 2B) of the output image. A curved line HL12 (dotted line) corresponds to an infinity line on a right image (an image portion based on an input image of the right camera 2R) of the output image, The curved lines HL10, HL11, HL12, and the re-projection axis CRT are diagrammatic drawings for illustrative purposes, and are not actually displayed on the output images.

As shown in FIG. 21A, before an adjustment by the image adjusting part 12, that is, under a condition where re-projection angles of re-projection lines relating to each of the three cameras share common value, the curved lines HL10, HL12 and HL11 become discontinuous. This is due to the fact that the installation height of the back camera 2B is different from the installation heights of the left camera 2L and the right camera 2R.

On the other hand, as shown in FIG. 21B, after an adjustment by the image adjusting part 12, that is, under a condition where re-projection angle of re-projection lines relating to each of the three cameras are determined individually, the curved lines HL10, HL11, and HL12 may become continuous.

In the present embodiment, the image adjusting part 12 acquires a desired infinity line position (fox example, a distance between the curved lines HL10, HL11, HL12 and the re-projection axis CTR) which an operator inputs through an input device (not shown). Then, the image adjusting part 12 individually determines re-projection angles of re-projection lines relating to each of the three cameras based on the acquired infinity line position.

In this way, the image adjusting part 12 determines re-projection angles for each camera (each input image) in response to an operation input of the operator so that the curved lines HL10, HL11, HL12 become continuous at the desired infinity line position. That is, positions, which correspond to infinity lines on each of the left image, the back image, and the right image, become continuous.

Due to the above configuration, the image creating device 100A mounted on the shovel 70 can bring about the same effect as the image creating device 100 mounted on the jib crane 60.

Although the preferred embodiments of the present invention have been explained in detail, the present invention is not limited to the above-mentioned embodiments and various variations and replacements may be applied to the above-mentioned embodiments without departing from the scope of the present invention.

For example, in the above embodiment, the image creating device 100 adapts a cylindrical space model MD as a space model. However, the image creating device 100 may adapt a space model having another columnar shape such as a polygonal column, or adapt a space model comprised of two surfaces of a bottom surface and a side surface, or may adapt a space model having only a side surface.

Also, in the above embodiment, the image creating device 100 is mounted on the jib crane 60 which moves on a rail. And, the image creating device 100 constitutes an operation assisting system which assists a travel of the running body 61 while displaying a running body monitoring image to an operator. However, the image creating device 100 may be mounted on another outdoor travelling crane which moves on a rail, and may constitute an operation assisting system which assists an operation of the travelling crane. Moreover, the image creating device 100 may be mounted on an unloader moving on a rail such as a continuous unloader using a bucket elevator or a grab bucket, and may constitute an operation assisting system which assists an operation of the unloader.

Also, the image creating device 100A is mounted on a self-propelled construction machine having movable members such as a bucket, an arm, a boom, a turning mechanism, or the like, and constitutes an operation assisting system which assists a travel of the construction machine and operations of the movable members while displaying an image of surroundings to an operator thereof. However, the image creating device 100A may be mounted on another non-self-propelled operated body with moving members such as an industrial machine, a fixed crane, or the like, and may constitute an operation assisting system which assists an operation of the another operated body.

The above mentioned embodiments can provide a processing-target image creating device and a processing-target image creating method that further facilitate an adjustment of an output image, and an operation assisting system using the device or method thereof.

What is claimed is:

1. An image creating device comprising:
   a memory; and
   a processor coupled to the memory, and configured to
   create an output image based on a plurality of input images captured by a plurality of cameras installed at different heights, the output image having a shape of a partial circle; and
   associate coordinates on a plurality of input image planes in each of which a corresponding one of the plurality of input images is positioned, coordinates on a space model onto which the plurality of input images are projected, coordinates on a re-projection plane onto which the plurality of input images projected on the space model are re-projected, and coordinates on an output image plane in which the output image is positioned,
   wherein the plurality of input images include respective feature images representing a predetermined feature, and a slope of a re-projection line relative to a re-projection axis that is a central axis of the space model is adjusted independently for each of the plurality of input images such that the feature images of the plurality of input images are continuous in a circumferential direction of the partial circle in the output image, the re-projection line being a straight line joining first coordinates on the space model and second coordinates on the re-projection plane corresponding to the first coordinates,
   the predetermined feature is an infinity line or a white line horizontally drawn on a wall surface around a running body of a jib crane or a turning body of a shovel,
   when the predetermined feature is the infinity line, the slope of the re-projection line relative to the re-projection axis is adjusted independently for each of the plurality of input images such that positions corresponding to the infinity line in a plurality of image parts of the output image are continuous, the plurality of image parts corresponding to the plurality of input images, so that a sky appears same in the plurality of image parts, and
   when the predetermined feature is the white line, the slope of the re-projection line relative to the re-projection axis is adjusted independently for each of the plurality of input images such that respective image portions of the plurality of image parts of the output image, which image portions represent the white line, are continuous, the plurality of image parts corresponding to the plurality of input images.

2. The image creating device as claimed in claim 1, wherein the processor is configured to
   update the slope of the re-projection line relative to the re-projection axis independently for each of the plurality of input images in response to a change in a cylindrical radius of the space model, such that a continuity of the predetermined feature is maintained through the plurality of image parts of the output image, the plurality of image parts corresponding to the plurality of input images; and
   change allocation rates of a horizontal image area and a road surface image area while maintaining the continuity of the predetermined feature in the output image.

3. An image creating device comprising:
   a memory; and
   a processor coupled to the memory, and configured to
   create an output image by synthesizing a plurality of input images captured by a plurality of cameras installed at different heights,
   wherein a planar overhead image is created as the output image by processing the plurality of input images such that a viewpoint of the output image is different from viewpoints of the plurality of input images, the output image including a plurality of image parts corresponding to respective imaging ranges of the plurality of cameras,
   the plurality of input images include respective feature images representing a feature extending over the plurality of input images, an offset between the feature images on a dividing line between the plurality of image parts corresponding to the plurality of input images is reduced in the output image, and the feature is a white line horizontally drawn on a wall surface around a running body of a jib crane or a turning body of a shovel.

4. The image creating device as claimed in claim 3, wherein the output image having a shape of a partial circle, and the feature is continuous in a circumferential direction of the partial circle.

5. The image creating device as claimed in claim 3, wherein the plurality of cameras are installed at different heights, coordinates of each of the plurality of input images are associated with coordinates of the output image via coordinates of a space model with the coordinates of the space model and the coordinates of the output image being associated by straight lines, and inclinations of the straight lines are individually determined to be different from each other such that coordinates of the output image corresponding to an image of the feature in one of the plurality of input images coincide with coordinates of the output image corresponding to an image of the feature in another one of the plurality of input images adjacent to said one of the plurality of input images.

6. The image creating device as claimed in claim 3, wherein the processor is configured to associate coordinates on a plurality of input image planes in each of which a corresponding one of the plurality of input images is positioned, coordinates on a space model onto which the plurality of input images are projected, coordinates on a re-projection plane onto which the plurality of input images projected on the space model are re-projected, and coordinates on an output image plane in which the output image is positioned, and adjust the output image by determining a slope of a re-projection line relative to a re-projection axis that is a central axis of the space model independently for each of the plurality of input images, the re-projection line being a straight line joining first coordinates on the space model and second coordinates on the re-projection plane corresponding to the first coordinates.

7. The image creating device as claimed in claim 3, wherein the plurality of cameras are attached to the running body of the jib crane, and wherein, in the output image, an image of surroundings viewed from the running body in a horizontal direction is shown around an image of a neighborhood of the running body viewed from above the running body, and a horizon is shown in an arc shape.

8. The image creating device as claimed in claim 3, wherein the plurality of cameras are attached to the turning body of the shovel, and in the output image, an image of surroundings viewed from the turning body in a horizontal direction is shown around an image of a neighborhood of the turning body viewed from above the turning body, and a horizon is shown in an arc shape.

9. An image creating device comprising:

a memory; and a processor coupled to the memory, and configured to create an output image by synthesizing a plurality of input images captured by a plurality of cameras installed at different heights, wherein a planar overhead image is created as the output image by processing the plurality of input images such that a viewpoint of the output image is different from viewpoints of the plurality of input images, the output image including a plurality of image parts corresponding to respective imaging ranges of the plurality of cameras, the plurality of input images include respective feature images representing a feature extending over the plurality of input images, an offset between the feature images on a dividing line between the plurality of image parts corresponding to the plurality of input images is reduced in the output image, the feature is an infinity line, and an offset between positions corresponding to the infinity line in the plurality of image parts of the output image on the dividing line is reduced, so that a sky appears same in the plurality of image parts.

10. The image creating device as claimed in claim 9, wherein the positions corresponding to the infinity line in the plurality of image parts of the output image are caused to be continuous or move based on a position of the infinity line input by an operator.

11. The image creating device as claimed in claim 9, wherein the positions corresponding to the infinity line in the plurality of image parts of the output image are caused to be continuous or move directly by an input of a position of the infinity line by an operator.

12. The image creating device as claimed in claim 9, wherein the plurality of input images are a left image, a back image, and a right image captured by a left camera, a back camera, and a right camera provided on a left, a back, and a right of a turning body of a shovel, respectively, and the offset between the positions corresponding to the infinity line in the plurality of image parts of the output image on the dividing line is reduced, the plurality of image parts corresponding to the left image, the back image, and the right image.

13. The image creating device as claimed in claim 9, wherein the output image having a shape of a partial circle, and the feature is continuous in a circumferential direction of the partial circle.

14. The image creating device as claimed in claim 9, wherein the plurality of cameras are installed at different heights, coordinates of each of the plurality of input images are associated with coordinates of the output image via coordinates of a space model with the coordinates of the space model and the coordinates of the output image being associated by straight lines, and inclinations of the straight lines are individually determined to be different from each other such that coordinates of the output image corresponding to an image of the feature in one of the plurality of input images coincide with coordinates of the output image corresponding to an image of the feature in another one of the plurality of input images adjacent to said one of the plurality of input images.

15. The image creating device as claimed in claim 9, wherein the processor is configured to
- associate coordinates on a plurality of input image planes in each of which a corresponding one of the plurality of input images is positioned, coordinates on a space model onto which the plurality of input images are projected, coordinates on a re-projection plane onto which the plurality of input images projected on the space model are re-projected, and coordinates on an output image plane in which the output image is positioned, and
- adjust the output image by determining a slope of a re-projection line relative to a re-projection axis that is a central axis of the space model independently for each of the plurality of input images, the re-projection line being a straight line joining first coordinates on the space model and second coordinates on the re-projection plane corresponding to the first coordinates.

16. The image creating device as claimed in claim 9,
- wherein the plurality of cameras are attached to a running body of a jib crane, and
- wherein, in the output image, an image of surroundings viewed from the running body in a horizontal direction is shown around an image of a neighborhood of the running body viewed from above the running body, and a horizon is shown in an arc shape.

17. The image creating device as claimed in claim 9, wherein
- the plurality of cameras are attached to a turning body of a shovel, and
- in the output image, an image of surroundings viewed from the turning body in a horizontal direction is shown around an image of a neighborhood of the turning body viewed from above the turning body, and a horizon is shown in an arc shape.

* * * * *